United States Patent
Yamazaki

(10) Patent No.: US 6,687,057 B1
(45) Date of Patent: Feb. 3, 2004

(54) IMAGE DISPLAY APPARATUS HAVING ROTATIONALLY ASYMMETRIC PHASE DISTRIBUTION

(75) Inventor: Shoichi Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 223 days.

(21) Appl. No.: 09/628,662

(22) Filed: Jul. 28, 2000

(30) Foreign Application Priority Data

Nov. 17, 1999 (JP) ............................................. 11-326644

(51) Int. Cl.[7] ................................................ G02B 27/14
(52) U.S. Cl. ........................ 359/637; 359/631; 359/630
(58) Field of Search ................................. 359/630, 631, 359/632, 633, 636, 637, 640, 833, 834; 345/7, 8, 9

(56) References Cited

U.S. PATENT DOCUMENTS

| | | | | |
|---|---|---|---|---|
| 4,220,400 A | * | 9/1980 | Vizenor | 359/631 |
| 5,701,202 A | * | 12/1997 | Takahashi | 359/631 |
| 5,768,025 A | * | 6/1998 | Togino et al. | 359/633 |
| 5,875,056 A | * | 2/1999 | Takahashi | 345/8 |
| 6,134,051 A | * | 10/2000 | Hayakawa et al. | 359/630 |
| 6,351,333 B2 | | 2/2002 | Araki et al. | 359/566 |
| 6,384,983 B1 | * | 5/2002 | Yamazaki et al. | 345/8 |

* cited by examiner

*Primary Examiner*—Ricky Mack
(74) *Attorney, Agent, or Firm*—Fitzpatrick, Cella, Harper & Scinto

(57) ABSTRACT

A prism body has three or more optical surfaces, inclusive of a decentered optical surface with curvature, and has a positive refractive power. The optical surfaces include a diffracting surface having a rotationally asymmetric phase distribution, or the optical surfaces include a diffracting surface having a rotationally symmetric phase distribution on a surface with refractive powers differing depending upon azimuthal angles. An image display apparatus has the prism body and is constructed in such structure that, using the prism body, light from a display displaying image information is guided to the pupil position of an observer to permit the observer to observe the image information displayed on the display.

12 Claims, 7 Drawing Sheets

IMAGE DISPLAY APPARATUS HAVING ROTATIONALLY ASYMMETRIC PHASE DISTRIBUTION

BACKGROUND OF THE INVENTION

1. Field of the Invention

The present invention relates to an image display apparatus and, more particularly, to the image display apparatus suitably applicable to display apparatus called head-mounted displays (HMDs) and goggle type displays.

2. Related Background Art

A variety of proposals have been made heretofore about the image display apparatus of the head mounted type, so called the head-mounted displays (HMDs), constructed to guide image information displayed on such an image display element as a liquid crystal panel or the like, through a display optical system so as to permit an observer to observe an enlarged, virtual image thereof.

Japanese Patent Application Laid-Open Nos. 7-181391 and 9-258104 suggest the HMDs using a prism and a diffraction optical element as a scanning optical system.

These are constructed in such structure that the image information displayed on a liquid crystal display (LCD) is observed through an eyepiece optical system composed of a combination of a prism optical system with another lens system.

Japanese Patent Application Laid-Open No. 9-258104 describes the HMD wherein the eyepiece optical system includes a decentered prism having decentered surfaces with curvature and wherein an optical element including a diffractive surface with reciprocal dispersion characteristics of the large Abbe's number of −3.45 (hereinafter referred to as DOE) is placed between the LCD and the decentered prism or between the decentered prism and the eye (observer), thereby canceling chromatic aberration occurring in the decentered prism.

Japanese Patent Application Laid-Open No. 7-181391 describes the HMD wherein the eyepiece optical system is a combination of a normal prism with a refracting lens (and thus is not a decentered optical system) and wherein the DOE is adopted for a surface of the prism or the refracting lens in order to correct for chromatic aberration well.

As seen from the numerical examples of these applications, they both employ the DOE having a rotationally symmetric phase distribution on a rotationally symmetric surface.

Since the apparatus is mounted on the observer's head, it has been desired heretofore that the image display apparatus for the HMDs be compact and lightweight and permit good observation of the display image on the display means.

In the image display apparatus disclosed in Japanese Patent Application Laid-Open No. 9-258104, the decentered prism is small and the display optical system can be made very thin. However, if this display optical system is composed of both the optical element with the DOE surface and the decentered prism, it will tend to become large.

It will also require highly accurate adjustment between the two members in the assembling process. Since the apparatus described in Japanese Patent Application Laid-Open No. 7-181391 uses the normal prism instead of the decentered optical system, the thickness of the entire optical system tends to be large.

SUMMARY OF THE INVENTION

An object of the present invention is to provide a compact optical system permitting easy correction for the decentering chromatic aberration and observation of image information displayed on the display means with high image quality, and an image display apparatus using it.

A prism body according to one aspect of the present invention is a prism body having a positive refractive power and having three or more optical surfaces, inclusive of a decentered optical surface with curvature, wherein said optical surfaces comprise a diffracting surface having a rotationally asymmetric phase distribution.

In a further aspect of the present invention, said diffracting surface is provided in said decentered optical surface with curvature.

In a further aspect of the present invention, said prism body comprises a plurality of reflecting surfaces with curvature.

In a further aspect of the present invention, said diffracting surface has a symmetric phase distribution on a cross section normal to a cross section in which said optical surface is decentered.

In a further aspect of the present invention, at least one of said reflecting surfaces is a surface with refractive powers differing depending upon azimuthal angles.

In a further aspect of the present invention, said prism body comprises an optical surface with curvature having both transmitting action and totally reflecting action.

In a further aspect of the present invention, said prism body comprises a first transmitting surface to which light is incident, a first reflecting surface which totally reflects light from the first transmitting surface, a second reflecting surface which reflects reflected light from the first reflecting surface, and a second transmitting surface which has the same shape as the first reflecting surface and which transmits reflected light from the second reflecting surface.

In a further aspect of the present invention, the first transmitting surface or/and the second reflecting surface of said prism body are diffracting surfaces having a rotationally asymmetric phase distribution.

In a further aspect of the present invention, said diffracting surface having the rotationally asymmetric phase distribution is provided in a transmitting surface.

A prism body according to a further aspect of the present invention is a prism body having a positive refractive power and having three or more optical surfaces, inclusive of a decentered optical surface with curvature, wherein the optical surfaces comprise a diffracting surface having a rotationally symmetric phase distribution on a surface with refractive powers differing depending upon azimuthal angles.

A prism body according to one aspect of the present invention is a prism body having a positive refractive power and having three or more optical surfaces, inclusive of a decentered optical surface with curvature, wherein the optical surfaces comprise a diffracting surface having a rotationally asymmetric phase distribution on a surface with refractive powers differing depending upon azimuthal angles.

An image display apparatus according to one aspect of the present invention is an image display apparatus wherein, using the prism body described above, light from display means displaying image information is guided to the pupil position of an observer to permit the observer to observe the image information displayed on the display means.

In a further aspect of the image display apparatus of the present invention, the light from said display means is guided to the observer without forming an intermediate image in said prism body.

An image display apparatus according to one aspect of the present invention is an image display apparatus wherein, using the prism body described above, light from display means displaying image information is guided to the pupil position of an observer and one optical surface of the prism body is comprised of a half mirror surface, whereby the observer is permitted to observe both the image information displayed on the display means and image information of the outside through the half mirror surface, in a common field.

An optical system according to one aspect of the present invention is an optical system comprising a plurality of decentered, reflecting surfaces with curvature, said optical system comprising a diffracting surface having a rotationally asymmetric phase distribution.

In a further aspect of the optical system of the present invention, at least one of said reflecting surfaces is a surface with refractive powers differing depending upon azimuthal angles.

In a further aspect of the optical system of the present invention, said diffracting surface having the rotationally asymmetric phase distribution is provided in a transmitting surface.

In a further aspect of the optical system of the present invention, said optical system comprises a prism body and an optical member, wherein said prism body has three or more optical surfaces, inclusive of a decentered optical surface with curvature.

In a further aspect of the optical system of the present invention, said diffracting surface is provided in a surface forming said prism body.

In a further aspect of the optical system of the present invention, said diffracting surface is provided in a surface of said optical member.

An image display apparatus according to one aspect of the present invention is an image display apparatus wherein, using the optical system described above, light from display means displaying image information is guided to the pupil position of an observer to permit the observer to observe the image information displayed on the display means.

In a further aspect of the image display apparatus of the present invention, the light from said display means is guided to the observer without forming an intermediate image in said optical system.

An image display apparatus according to one aspect of the present invention is an image display apparatus wherein, using the optical system described above, light from display means displaying image information is guided to the pupil position of an observer and one optical surface of the optical system is a half mirror surface, whereby the observer is permitted to observe both the image information displayed on the display means and image information of the outside through the half mirror surface, in a common field.

An optical system according to one aspect of the present invention is an optical system comprising a plurality of decentered, reflecting surface with curvature, said optical system comprising a diffracting surface having a rotationally symmetric phase distribution on a surface with refractive powers differing depending upon azimuthal angles.

An optical system according to one aspect of the present invention is an optical system comprising a plurality of decentered, reflecting surface with curvature, said optical system comprising a diffracting surface having a rotationally asymmetric phase distribution on a surface with refractive powers differing depending upon azimuthal angles.

A prism body according to one aspect of the present invention is a prism body comprising an optical surface having rotationally asymmetric, transmissive-refractive powers or reflective-refractive powers, and a diffracting surface having a rotationally asymmetric phase distribution.

In the prism body according to a further aspect of the present invention, said optical surface and said diffracting surface are a common surface or different surfaces.

A prism body according to one aspect of the present invention is a prism body comprising an optical surface having rotationally asymmetric, transmissive-refractive powers or reflective-refractive powers, and a diffracting surface having a rotationally symmetric phase distribution.

In a further aspect of the present invention, said optical surface and said diffracting surface are a common surface or different surfaces.

DETAILED DESCRIPTION OF THE PREFERRED EMBODIMENTS

Figure 1:
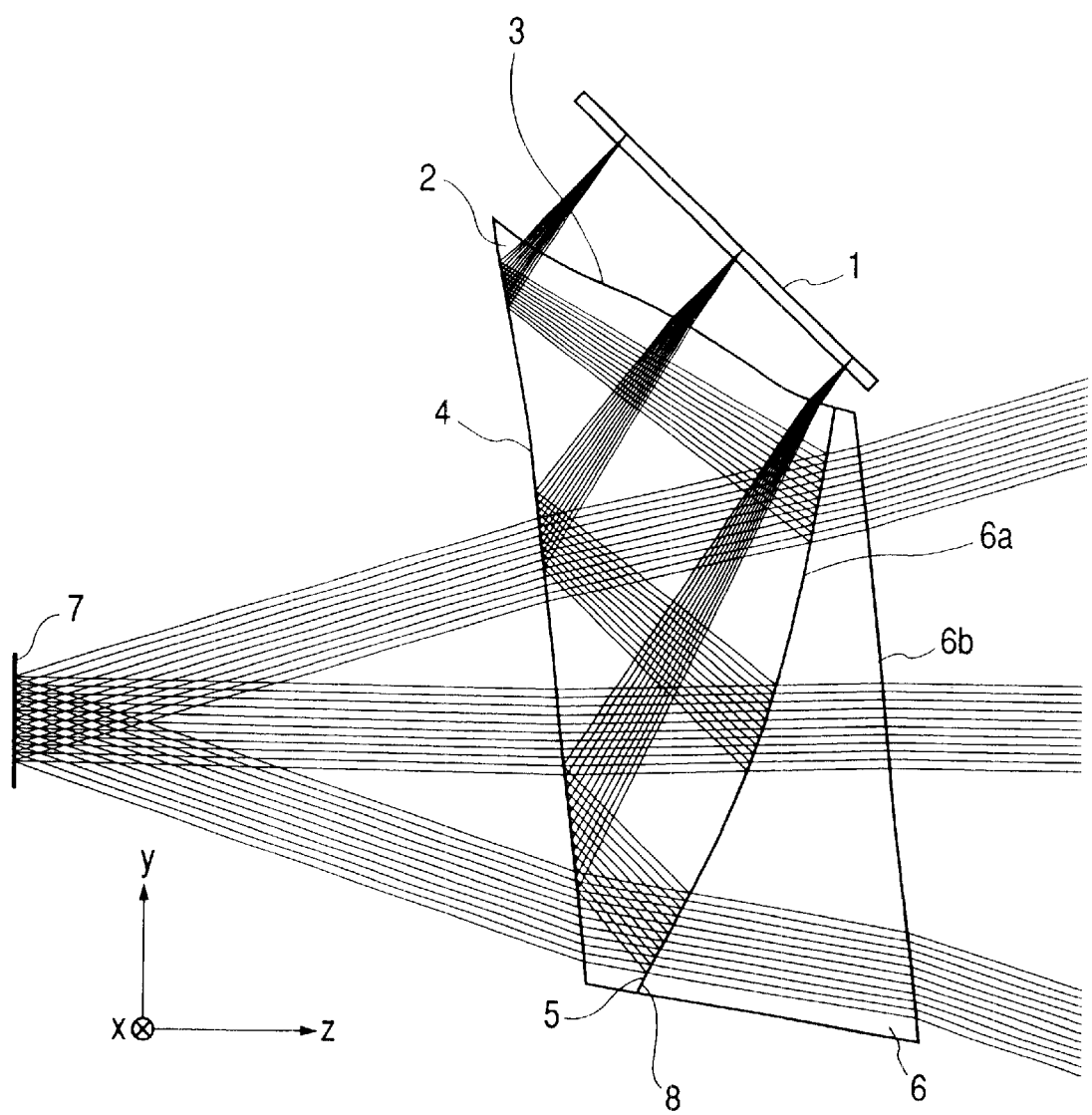
FIG. 1 is a schematic diagram to show the main part of an embodiment of the image display apparatus according to the present invention.
Figure 2:
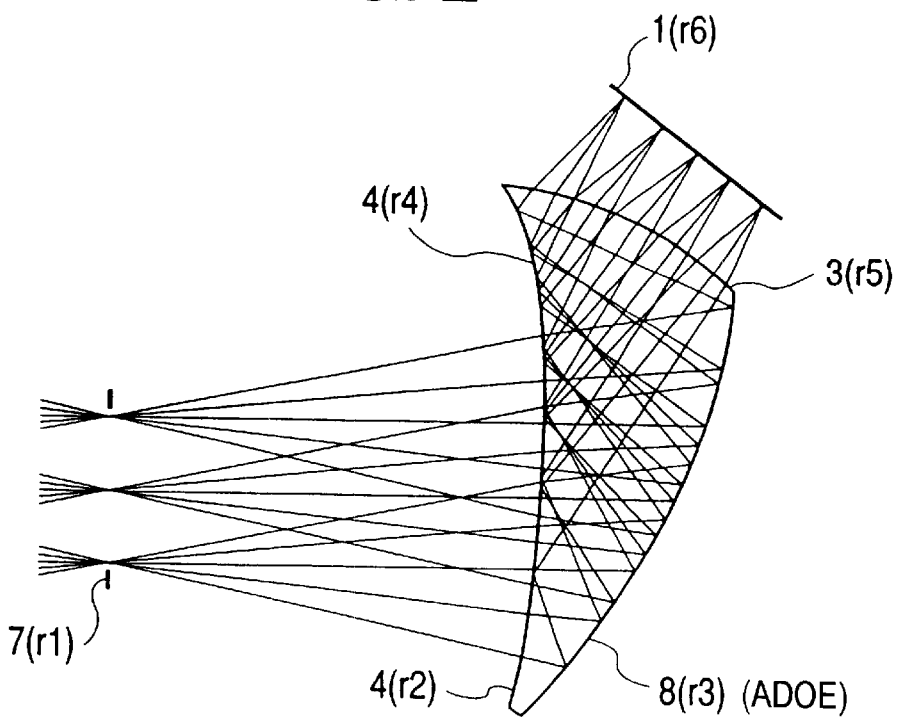
FIG. 2 is a schematic diagram to show the main part of Embodiment 1 of the image display apparatus according to the present invention.
Figure 3:
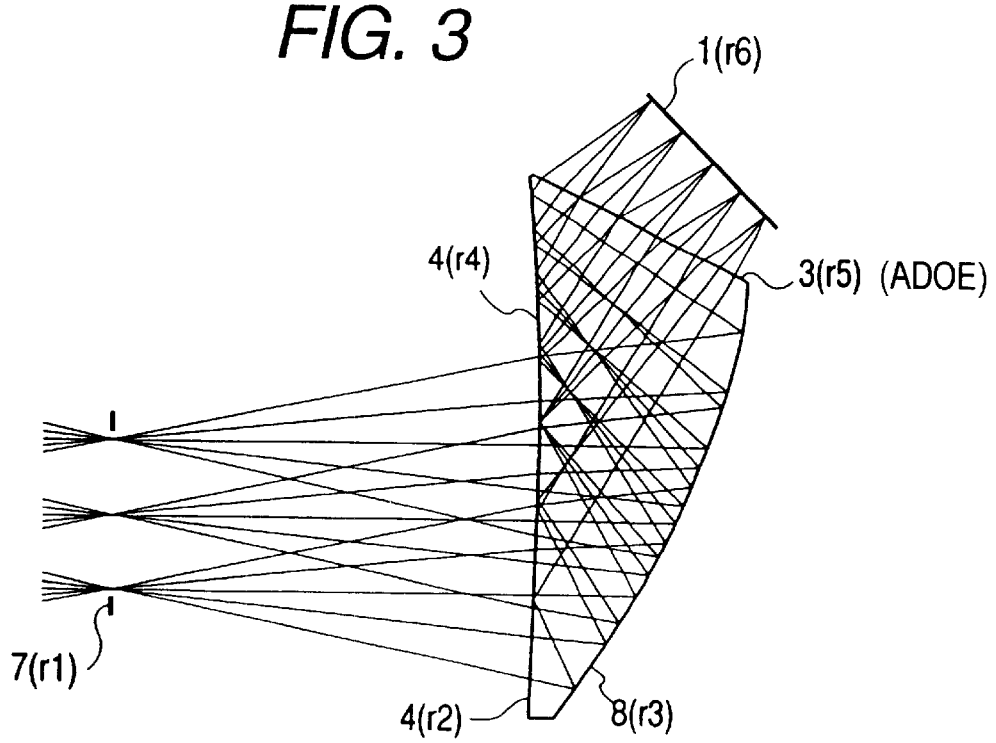
FIG. 3 is a schematic diagram to show the main part of Embodiment 2 of the image display apparatus according to the present invention.
Figure 4:
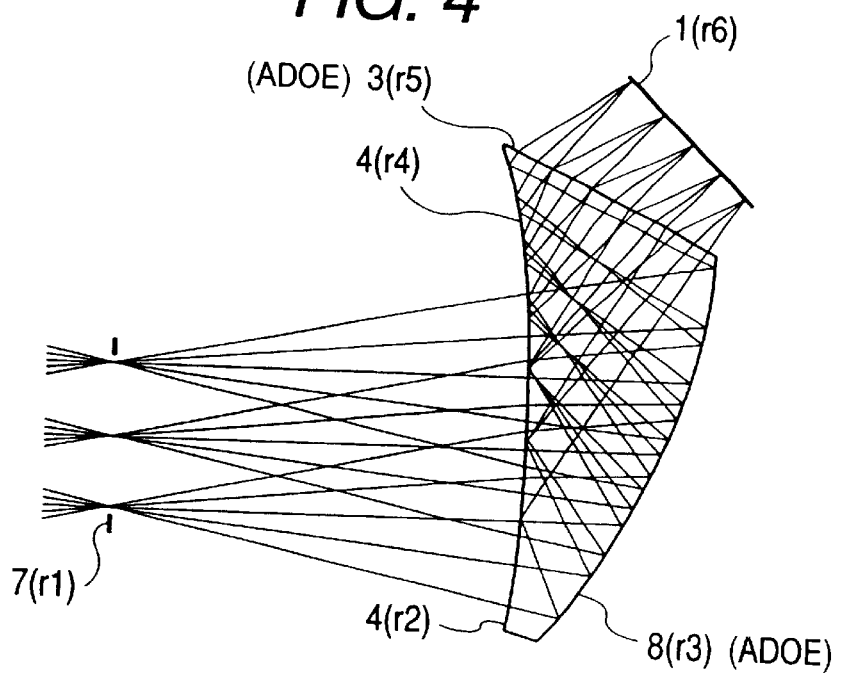
FIG. 4 is a schematic diagram to show the main part of Embodiment 3 of the image display apparatus according to the present invention.
Figure 5:
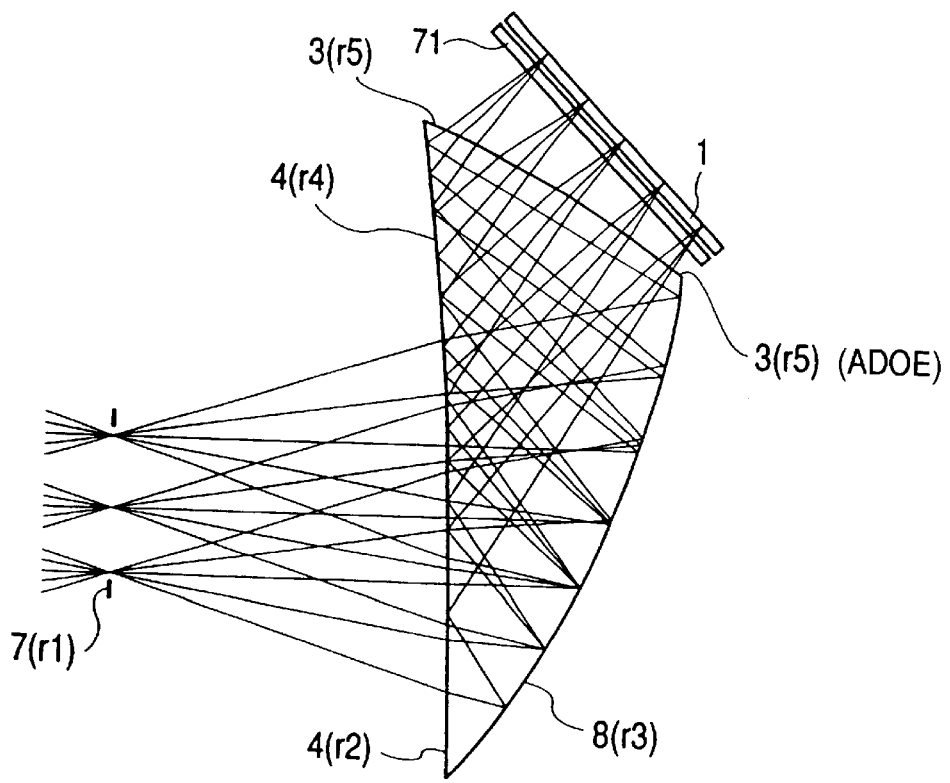
FIG. 5 is a schematic diagram to show the main part of Embodiment 4 of the image display apparatus according to the present invention.
Figure 6:
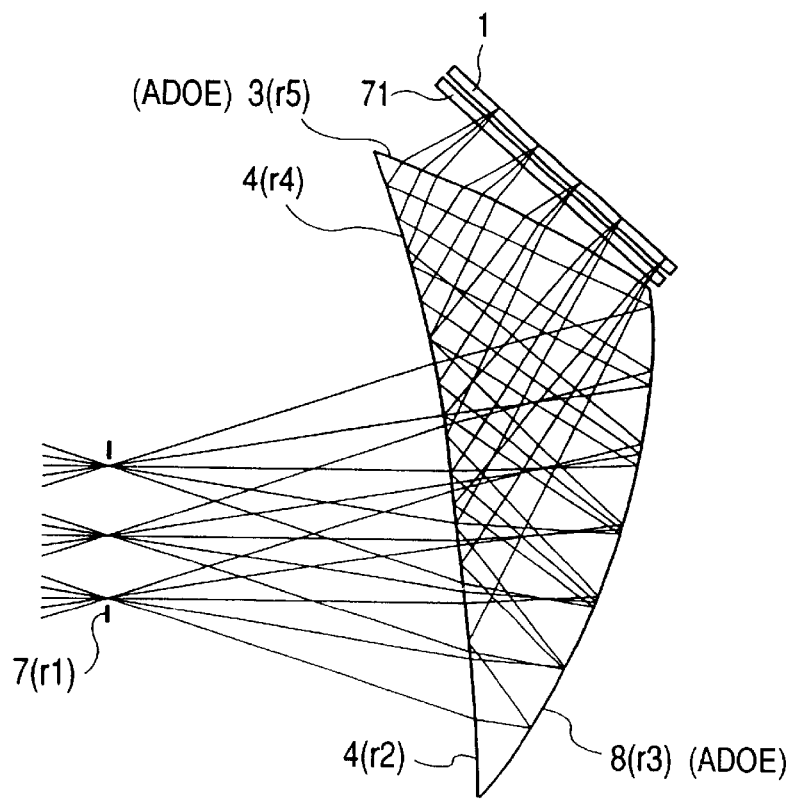
FIG. 6 is a schematic diagram to show the main part of Embodiment 5 of the image display apparatus according to the present invention.

FIG. 1 is a schematic diagram to show the main part of Embodiment 1 of the image display apparatus using the prism body of the present invention. In FIG. 1, reference numeral 1 designates a display means in which an image including characters, graphics, etc. as an original image is displayed and which is comprised, for example, of a known liquid crystal display (LCD).

Numeral 2 denotes a prism body (optical means) of a positive refractive power with imaging action for guiding light from the display means 1 to the observer's eyes (pupils) 7.

In the present embodiment the optical system is comprised of one prism body 2. The light from the display means 1 is incident to an entrance surface 3 of the prism body 2, is then incident at an angle over the critical angle to a surface 4 to be totally reflected, is reflected at a concave surface 5, is then incident at an angle below the critical angle this time to the surface 4 to emerge from the surface 4, and thereafter is guided to the eyes 7.

Free curved surfaces are used for three surfaces, the entrance surface 3, the surface 4, and the concave surface 5, of the prism body 2, thereby controlling the decentering aberration.

Since the curved surface 4 is designed to satisfy the condition of the total reflection surface for all effective rays on the occasion of incidence of light to the surface 4, the display optical system can be constructed theoretically with no light amount loss.

The region of the surface 4 without necessity for transmitting action (i.e., the upper part of the surface 4 in the drawing) may be constructed as a 100%-reflecting mirror of a metal film. The present embodiment employs a diffractive surface (diffraction optical element) in the entrance surface 3 or the concave surface 5.

The image information displayed on the display means 1 is observed as an enlarged, virtual image at the pupil position 7 through the prism body 2.

Each of the prism body 2 and the display means 1 constitutes an element of the display optical system. When the image display apparatus of FIG. 1 is used as an observation device for observation of only the image information displayed on the display means 1, the concave surface 5 of the prism body 2 is formed as a reflective mirror surface of a deposited film of Al, Ag, or the like.

When the optical system is used in the form of a seethrough optical system described hereinafter (which is an optical system permitting observation of both the image information of the display means and the image information of the outside), the apparatus can be constructed either in the structure in which the concave surface 5 is a half mirror surface to guide the light from the outside directly through the concave surface 5 or in the structure in which a correction prism body 6 is used, as illustrated in FIG. 1, to take in light having passed through the prism body 6 and the prism body 2.

When the image display apparatus of the present embodiment is used as the apparatus of the seethrough system for permitting the observer to observe both the image information displayed on the display means 1 and the image information of the outside, the correction prism body 6 is used for canceling the optical, refractive power of the seethrough system.

The correction prism body 6 has a surface 6a having the same shape as the concave surface 5 of the prism body 2, and an entrance surface 6b which is a plane or an aspherical surface or a free curved surface.

The concave surface 5 of the prism body 2 and the surface 6a of the correction prism body 6 are comprised of a half mirror surface.

Light from an object (not illustrated) in the outside is incident to the entrance surface 6b of the correction prism body 6, travels through the surface 6a, the concave surface 5, and the surface 4 to enter the observer's pupils 7.

With the image display apparatus of FIG. 1, the observer can observe both the image information displayed on the display means and the object in the outside, in the common field.

The features of the prism body of the present invention and the image display apparatus using it will be described below.

The prism body of the present invention is comprised of three or more different optical surfaces, inclusive of a decentered surface with curvature, and has a positive refractive power as a whole. A diffractive surface having a rotationally asymmetric phase distribution (hereinafter referred to as rotationally asymmetric DOE) is present in the surface of the prism body. This rotationally asymmetric DOE is a surface having both the function of restraining the decentering aberration of the free curved surfaces being rotationally asymmetric surfaces, and the function of the diffractive surface with reciprocal dispersion characteristics having the Abbe's number of −3.45 (DOE). In the decentered optical system having the decentered surfaces, since the chromatic aberration becomes rotationally asymmetric in the screen (to bring about decentering chromatic aberration), it is difficult to effect perfect correction for chromatic aberration by use of a diffractive surface having a rotationally symmetric phase distribution (rotationally symmetric DOE).

When the rotationally asymmetric DOE is employed for the prism surface, good correction can be made for the chromatic aberration throughout the entire region in the screen by only one prism body, without need for a DOE optical element member separate from the prism body, thereby realizing the compact and adjustment-free structure.

The other features of the image display apparatus using the prism body of the present invention will be described below.

The display apparatus of the present embodiment includes the display means 1 for displaying the image information, and the prism body 2. The prism body 2 guides the light from the display means to the eyes, and the display apparatus can be used as the HMD. The prism body 2 has a plurality of reflective surfaces with curvature and thus the prism body can be made thinner on the object side. At least one of the reflective surfaces is a surface with refractive powers differing depending upon azimuthal angles (hereinafter referred to as a free curved surface), thereby suppressing occurrence of the decentering aberration.

If two or more free curved surfaces are employed for the surfaces including the prism body, focal lengths of the entire system can be made approximately equal in two cross sections: a cross section on the cross-sectional view where the prism surfaces are decentered (which is the cross section where rays are bent, which corresponds to the cross section of optical paths of FIGS. 1 to 11, and which will be referred to hereinafter as a generating-line section) and a cross section on the cross-sectional view normal thereto (hereinafter referred to as a meridian-line section), thereby decreasing longitudinal and lateral image distortion.

When the decentering amounts of the prism surfaces are very large, it is desirable to make local focal lengths of the entire system approximately equal between in a local generating-line section and in a local meridian-line section. The generating-line section, meridian-line section, local generating-line section, local meridian-line section, and local focal lengths will be described hereinafter in the description of embodiments.

Further, the light from the display means 1 travels via the first transmitting surface 3, the first reflecting surface 4, the second reflecting surface 5, and the second transmitting surface 4 of the prism body 2 in the order named, thereby realizing not only the small profile but also the compact size of the optical system.

The optical system is also provided with the surface 4 with curvature having both the transmitting action and the total reflection action, i.e., the total reflection surface with curvature, whereby the bright and compact optical system is obtained theoretically without light amount loss of the optical system.

The phase distribution on the meridian-line section of the rotationally asymmetric DOE on the prism surface is a symmetric phase distribution with respect to the generating-line section.

In general, there are reports on fabrication of DOE in the rotationally symmetric structure of phase distribution, but there are few examples of the rotationally asymmetric DOE and thus fabrication thereof is difficult.

Since the decentering aberration is relatively less on the meridian-line section of the prism surface than on the generating-line section, the phase distribution is designed to be symmetric with respect to the generating-line section only on the meridian-line section, thereby facilitating the fabrication of the rotationally asymmetric DOE.

Since large decentering aberration inevitably occurs on the generating-line section of the prism surface, the phase distribution on the generating-line section is designed to be asymmetric with respect to the meridian-line section. When the rotationally asymmetric DOE is employed in the first transmitting surface 3 or the second reflecting surface 5 of the prism body, good correction can be made for the decentering chromatic aberration by use of only one free curved surface prism.

The apparatus can also be constructed in the structure, as illustrated in FIG. 1, wherein another prism body 6 with a free curved surface for correction for aberration is joined to or placed adjacent to the prism body 2 having the free curved surfaces and wherein the second reflecting surface (concave mirror 5) is replaced by a half mirror or the like. This can establish a seethrough optical system for superimposing the display image of the display means 1 on the outside scene.

When the rotationally asymmetric DOE is adopted in the first transmitting surface 3 or the second reflecting surface 5, it facilitates the good correction for the chromatic aberration of the display system and the establishment of the seethrough optical system.

When the rotationally asymmetric DOE is applied to the second reflecting surface 5, the light from the outside through the seethrough optical system is transmitted and diffracted at the second reflecting surface (half mirror) 5. In order to prevent degradation of optical performance at this time, it is desirable to keep the refractive indexes of the three materials of the prism body 2, the correction prism body 6, and a joint material 8 for adhesion of the prisms approximately equal (reference is made to the seethrough optical system of Embodiment 3, Table 12, and FIG. 13).

Figure 13:
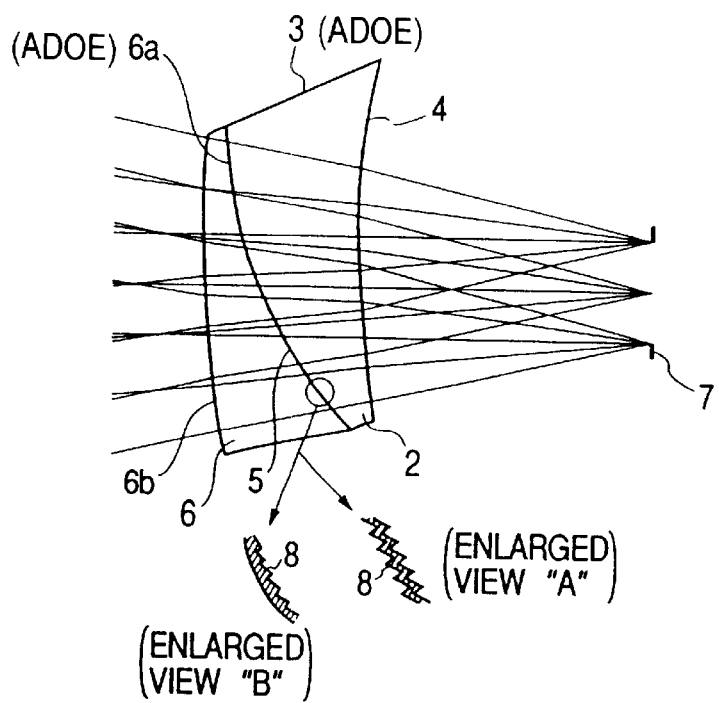
FIG. 13 is a schematic diagram to show the main part of the image display apparatus constructed as a seethrough system according to the present invention.

For the adhesion of the two prism bodies, there are two cases where the joint surface of the prism body 6 is also a rotationally asymmetric DOE (as in enlarged view A) and where it is not a DOE (as in enlarged view B), as shown in the enlarged views A, B of the second reflecting surface (half mirror) 5 in FIG. 13. The structure in the enlarged view B is easier to make. In the structure of the enlarged view A, if the joint surface of the prism body 6 is a rotationally asymmetric DOE having an opposite phase function to a phase function of the rotationally asymmetric DOE of the second reflecting surface (half mirror) 5, the phase functions will cancel each other and there will occur little degradation of optical performance of transmission and diffraction even if the refractive index of the joint material 8 is not equal (e.g., n=1) to that of the prisms.

Since as to the display optical system the rotationally asymmetric DOE of the second reflecting surface 5 is of the reflection type, the physical depth of the DOE can be shallow, but sensitivity to manufacturing becomes double that of the transmission type. Therefore, higher manufacturing accuracy is required and adhesion of the correction prism body 6 becomes harder, too.

In contrast to it, where the first transmitting surface 3 is a rotationally asymmetric DOE, the accuracy can be lower and manufacturing is easier than the case of the reflecting surface. In addition, since there is no element negatively affecting the seethrough optical system, the seethrough system can be realized easily by the conventional methods (reference is made to the seethrough optical system of Embodiment 2, Table 11, and FIG. 12).

As described above, the display apparatus of the present invention has the display means 1 for displaying the image information, and the optical system including a plurality of decentered, reflecting surfaces with curvature, for guiding the light from the display means 1 to the eyes, and the optical system incorporates the diffractive surface having the rotationally asymmetric phase distribution (rotationally asymmetric DOE).

Figure 7:
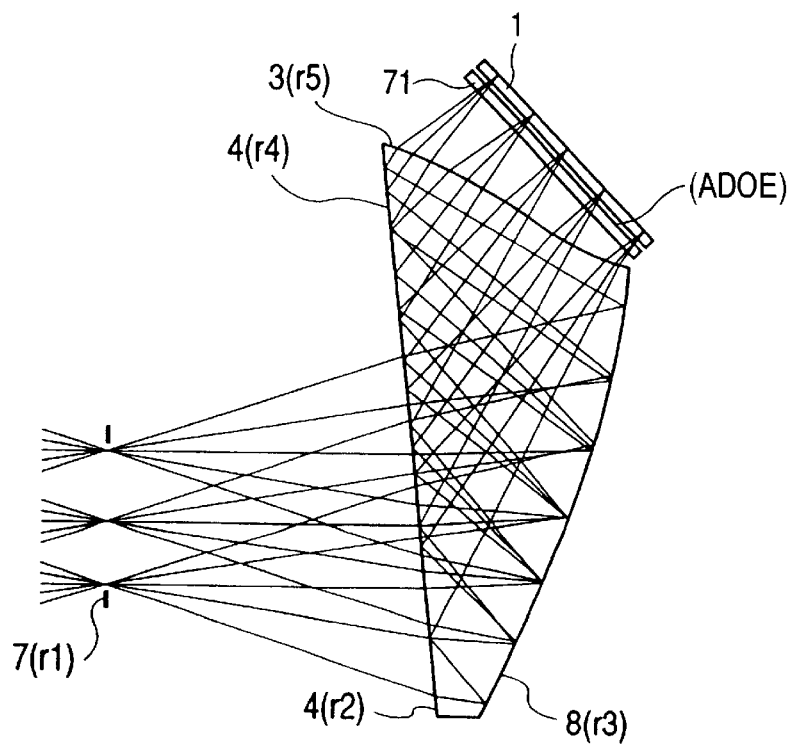
FIG. 7 is a schematic diagram to show the main part of Embodiment 6 of the image display apparatus according to the present invention.
Figure 8:
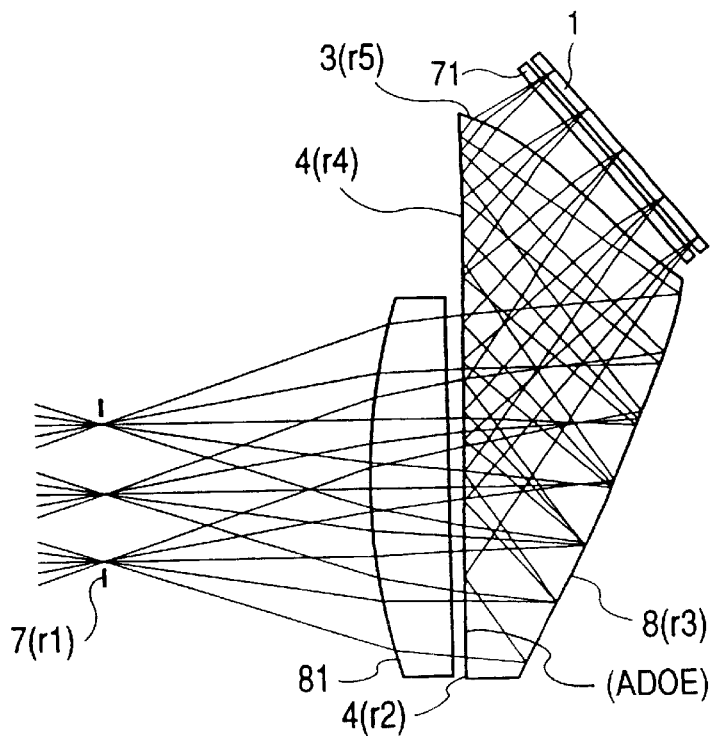
FIG. 8 is a schematic diagram to show the main part of Embodiment 7 of the image display apparatus according to the present invention.
Figure 9:
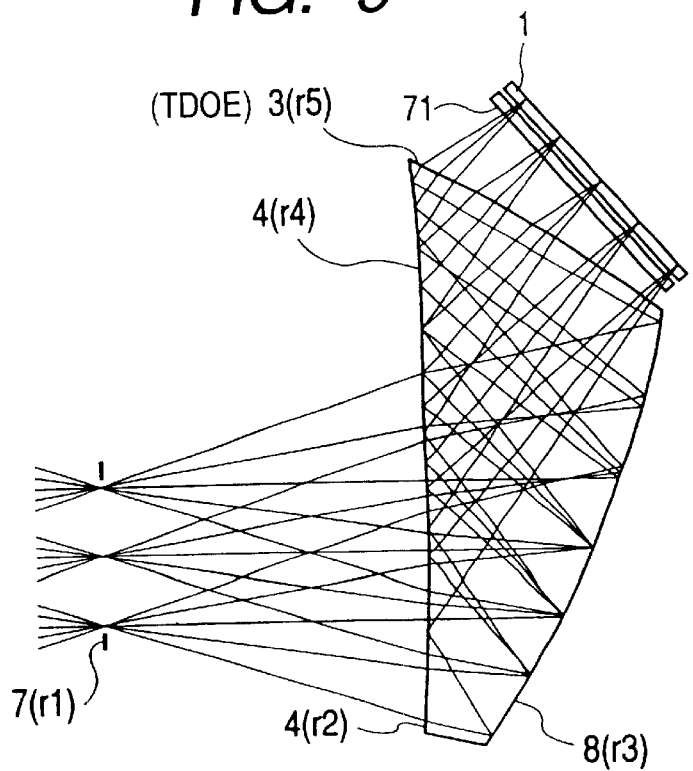
FIG. 9 is a schematic diagram to show the main part of Embodiment 8 of the image display apparatus according to the present invention.
Figure 10:
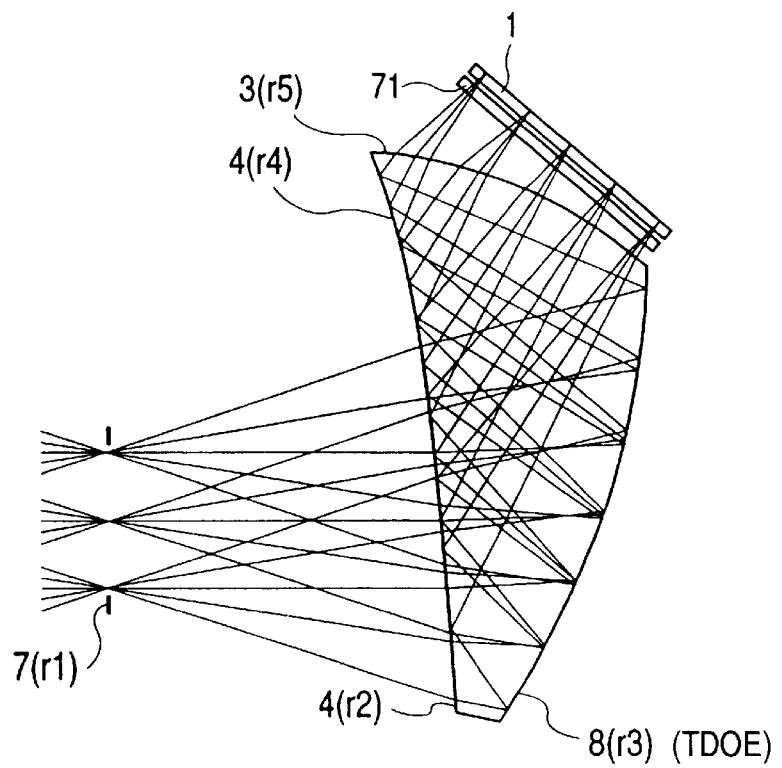
FIG. 10 is a schematic diagram to show the main part of Embodiment 9 of the image display apparatus according to the present invention.
Figure 11:
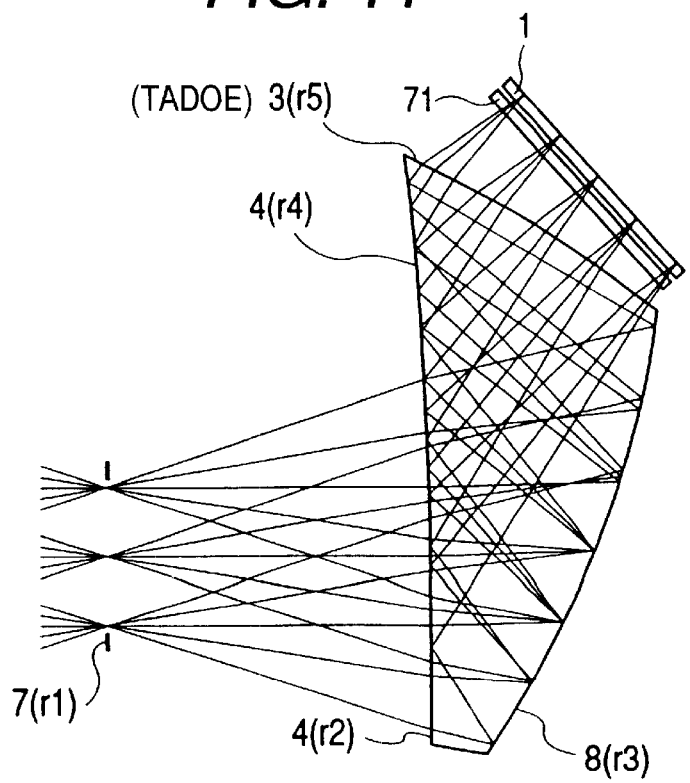
FIG. 11 is a schematic diagram to show the main part of Embodiment 10 of the image display apparatus according to the present invention.

The optical system is comprised of the prism body 2 in the present embodiment, but it can also be comprised of the prism body and another optical member (a lens or a parallel-plane plate). The rotationally asymmetric DOE can be provided in the optical member (FIG. 7 and FIG. 8 described hereinafter).

The rotationally asymmetric DOE is designed as one surface having both the function of suppressing the decentering aberration of the rotationally asymmetric, free curved surfaces and the function of the diffractive surface with the reciprocal dispersion characteristics having the Abbe's number of −3.45 (DOE). When this surface is adopted in part of the decentered optical system the thickness of which is decreased by the plurality of decentered, reflecting surfaces with curvature, various aberrations, including the decentering chromatic aberration, can be corrected for in good balance.

If the rotationally asymmetric DOE is adopted in the decentered, reflecting surface with curvature, the optical system can be formed in compact size, based on the decrease in the number of optical components of the optical system.

When the optical member having the rotationally asymmetric DOE, separate from the prism body, is used in the optical system, degrees of design freedom are increased, as compared with the case of adoption of the DOE element having the rotationally symmetric phase distribution, and correction can also be made for the decentering chromatic aberration. Therefore, various aberrations can be corrected for in good balance.

It is preferable that at least one of the plurality of decentered, reflecting surfaces with curvature be a surface with refractive powers differing depending upon azimuthal angles to suppress occurrence of not only chromatic aberration but also decentering aberration.

When two or more surfaces with refractive powers differing depending upon azimuthal angles are employed for the optical system, the total focal lengths in respective sections of the optical system can be made approximately equal between on the generating-line section where the prism body is decentered and on the meridian-line section normal thereto, so as to obtain an image with little distortion.

Even in the case of the very large decentering amounts of the surfaces, the local focal lengths of the entire system on the local generating-line section and on the local meridian-line section can be made approximately equal by use of two or more free curved surfaces, so as to obtain an image with little distortion.

Since the rotationally asymmetric DOE of the reflection type causes the degradation of optical performance due to manufacturing errors in the level of double that of the rotationally asymmetric DOE of the transmission type, the manufacturing accuracy for the reflection type needs to be higher.

It is thus desirable to adopt the rotationally asymmetric DOE in the transmitting surface in the optical system. For the rotationally asymmetric DOE, it is desirable to facilitate fabrication thereof, basically, by forming the diffracting element on a curved surface, providing the curved surface with refractive power while providing the diffracting element with as less refractive power as possible, and making grating pitch intervals of the diffracting element as large as possible.

In Embodiments 1 to 5 of the present invention the pitch intervals of the diffracting element are set to be as large as possible, by adding the diffracting surface having the rotationally asymmetric phase distribution to the rotationally symmetric curved surface.

In Embodiment 10 the diffracting surface having the rotationally asymmetric phase distribution is added to the free curved surface with refractive powers differing depending upon azimuthal angles and the free curved surface is provided with the optical refractive power, thereby further increasing the pitch intervals of the diffracting element in both the generating-line and meridian-line sections.

When the prism body is combined with the rotationally asymmetric DOE element wherein the rotationally asymmetric DOE is adopted in one surface of a parallel-plane plate or a lens having a weak refractive power, the degrees of design freedom are increased, as compared with the case of the DOE element having the rotationally symmetric phase distribution, and correction can also be made for the decentering chromatic aberration. Therefore, various aberrations can be corrected for well in good balance.

When the optical system is composed of the prism body and the parallel-plane plate and in such structure that one surface of the plane-parallel plate is the rotationally asymmetric DOE surface while the back surface thereof is a plane, the plate can also serve as a protective sheet (the protective sheet 71 on the side of display means 1 in Embodiment 6 and FIG. 7).

When the plane-parallel plate is interposed between the eyes and the prism body (with the rotationally asymmetric DOE surface of the parallel-plane plate being placed on the prism body side), the plate serves as a protective sheet for the optical system.

When the rotationally asymmetric DOE element is formed in the two-surface structure as described, the pitches of the rotationally asymmetric DOE can be set large by forming the rotationally asymmetric DOE on a plane of optical member (lens) 81 out of the prism body and the optical member 81 constituting the optical system of FIG. 8 and forming the other surface as a curved surface so as to provide this curved surface with most of refractive power. This permits relatively easier fabrication of the rotationally asymmetric DOE element with the refractive power capable of correcting for the decentering chromatic aberration (Embodiment 7 and FIG. 8).

Embodiment 8 (FIG. 9) and Embodiment 9 (FIG. 10) are examples in which the diffracting surface having the rotationally symmetric phase distribution is added onto the free curved surface with refractive powers differing depending upon azimuthal angles, wherein the decentering chromatic aberration is not corrected perfectly by the rotationally symmetric DOE, but the total chromatic aberration is improved, when compared with the configuration with only the free curved surfaces. Since these embodiments require no separate DOE optical element, they can also contribute to the size reduction of the apparatus.

Since the diffracting surface is one having the rotationally symmetric phase distribution, the fabrication thereof is also easier than that of the diffracting surface having the rotationally asymmetric phase distribution.

As described above, the present embodiment adopts the rotationally asymmetric DOE, which has both the function of restraining the decentering aberration of the rotationally asymmetric, free curved surfaces and the function of DOE, in part of the optical system, so as to realize the compact, low-cost, and adjustment-free structure without the need for the separate DOE element, thereby enabling adequate correction for the rotationally asymmetric, decentering chromatic aberration in the screen.

Even in cases where the conventional, rotationally symmetric DOE is employed for the free curved surface of the optical system, the invention can realize the compact, low-cost, and adjustment-free structure without the need for the separate DOE element, and also achieve improvement in chromatic aberration.

There are demands for wider angles of view and more compact structure than those now available for the optical systems of HMDs. For accomplishing the wider angles of view, it is necessary to realize an optical system with a higher enlargement rate, i.e., with a shorter focal length.

If a small liquid crystal display is used for making the apparatus more compact and making the angle of view as large as possible, the focal length of the optical system must be shortened, too. Chromatic aberration often tends to remain as residual aberration as the focal length of the optical system decreases.

Therefore, the present embodiment is intended for improvement in chromatic aberration and use of the present embodiment can decrease the focal length of the optical system, so as to considerably increase the possibility of achievement of still wider angles of view and much more compact structure.

In the present embodiment the optical system can also be constructed of a plurality of decentered, reflecting surfaces with curvature, instead of the prism body. For example, in FIG. 1, the surface 3 is replaced by a thin lens having a free curved surface, the surface 4 by a thin optical member having a free curved surface and comprised of a half mirror surface, and the surface 5 by a thin optical member having a free curved surface and comprised of a reflecting mirror surface of a deposit film of Al or Ag, or a half mirror surface, thus forming a hollow structure. Then at least one of the surfaces is constructed of a diffracting surface. For constructing a seethrough system in this structure, the correction prism body 6 does not have to be used, and the seethrough system can be obtained by just replacing the surface 5 with a half mirror.

Next described are the details of representation of each element in the embodiments of the image display apparatus of the present invention.

FIG. 2 to FIG. 13 are cross-sectional views to show the main part of the respective embodiments of Tables 1 to 12, described hereinafter, of the image display apparatus of the present invention (which are generating-line cross-sectional views at the azimuthal angle of 0°, represented by suffix y). When the surface vertex coordinate system of the first surface is taken as illustrated in FIG. 1, the yz cross section represents the generating-line section. The first surface is defined at the position of the observer's pupils 7, and the second, third, . . . , and nth surfaces are taken in order toward the display means 1.

The generating-line section of each surface except for the first surface is a yz section in a surface vertex coordinate system of each surface. Since the decentering of each surface is within the yz section in the present invention, all the generating-line sections are present in the same plane of the drawing.

The meridian-line section (at the azimuthal angle of 90°, represented by suffix x) is an xz cross section in the surface vertex coordinate system of each surface. These are definitions on the general-paraxial axis, and the local generating-line and local meridian-line sections on the local-paraxial axis are as described hereinafter.

Described next are the definitions of local curvature radius, local surface separation, local focal length, local refractive power, etc. for the decentered system applied to the optical systems of the image observation apparatus of the present invention.

In the present invention a reference ray is defined as a center ray emerging from the center of the image of the display means 1 or from the center of the outside scene and entering the center of the observation surface (eye 7), and the so-called local curvature radius, local surface separation, local focal length, and local refractive power defined with respect to a hit point (incident point) of the reference ray to each surface are used instead of the general, curvature radius, surface separation, focal length, and refractive power with respect to the vertex of each surface.

The local curvature radius herein represents a local curvature radius on a hit point of an optical surface (a radius of curvature on the local generating-line section or a radius of curvature on the local meridian-line section). The local surface separation is a value of distance between two hit points on a surface of interest and on a next surface thereto (which is the distance on the reference ray, without reduction to air distance).

The local focal length is a value calculated by the conventional focal length calculating method (paraxial tracing), based on the local curvature radius, the refractive indexes before and after the surface, and the local surface separation. The local refractive power is a value of the reciprocal of the local focal length.

The values for the general-paraxial axis and for the local-paraxial axis are calculated on the assumption that there is no contribution on the paraxial axis from the phase functions of the rotationally asymmetric DOE and the rotationally symmetric DOE.

In each embodiment of the present invention there are the general radius of curvature, surface separation, decentering amount, refractive index, and Abbe's number and the local curvature radius, refractive index of surface, local surface separation, local focal length, etc. of each surface given for reference.

In the reference ray the local generating-line section of each surface (at the azimuthal angle of 0°, represented by suffix y) is defined as a plane including an incident ray to and an emergent ray from each surface, and the local meridian-line section of each surface (at the azimuthal angle of 90°, represented by suffix x) as a plane being normal to the local generating-line section and parallel to the xz section of the surface vertex coordinate system while including a hit point.

Ten examples are presented as embodiments of the present invention. Numerical data of the display optical systems in Embodiments 1 to 10 are presented in Tables 1 to 10 and cross-sectional views of optical paths in FIGS. 2 to 11.

Figure 12:
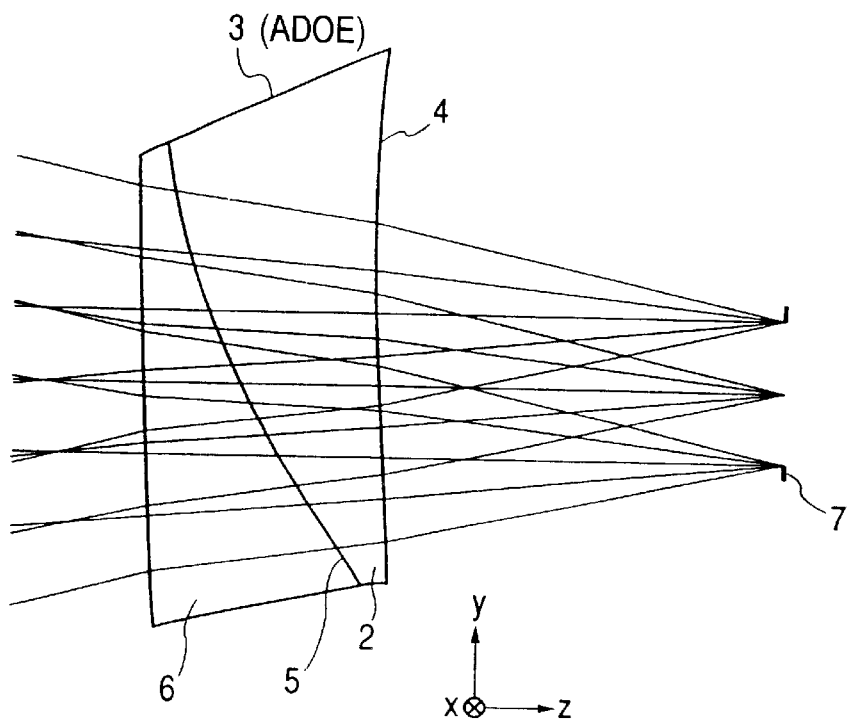
FIG. 12 is a schematic diagram to show the main part of the image display apparatus constructed as a seethrough system according to the present invention.

Numerical data of the seethrough optical systems obtained by adding the correction prism body 6 to the prism body 2 in Embodiments 2, 3 is presented in Tables 11, 12 and cross-sectional views of optical paths thereof in FIG. 12 and FIG. 13.

Tables 1 to 10 show the numerical data in the reverse tracing order from the eyes (pupils 7) to the liquid crystal display (display means 1), and the numerical data for the seethrough systems of Tables 11, 12 is given in the tracing order from the outside to the eyes (7).

In the section of (general-paraxial axis) of Tables 1 to 12, ry indicates the radius of curvature in the generating-line section, rx the radius of curvature in the meridian-line section, d the surface separation (in parallel to the surface vertex coordinate system of the first surface), "shift" and "tilt" decentering amounts ("shift" represents a parallel decentering amount of the vertex of each surface with respect to the vertex coordinate system of the first surface and "tilt" a tilt decentering amount, on the generating-line section), nd the refractive index for the d-line, vd the Abbe's number, FFS the free curved surface, ADOE addition of the rotationally asymmetric DOE to the conventional rotationally symmetric curved surface, TDOE addition of the rotationally symmetric DOE to the free curved surface (toroidal surface), and TADOE addition of the rotationally asymmetric DOE to the free curved surface (toroidal surface).

Each surface accompanied by M is a reflecting surface and the refractive index nd thereof for the d-line is given a reverse sign. A defining equation of FFS (free curved surface) is as follows (in the vertex coordinate system of each surface).

$$z = \frac{(x^2 + y^2)/r}{1 + \sqrt{(1 - (1 + c1)(x^2 + y^2)/r^2)}} + c5(x^2 - y^2) +$$
$$c6(2x^2 + 2y^2 - 1) + c10(3x^2y + 3y^3 - 2y) + c11(3x^2y - y^3) +$$
$$c12(x^4 - 6x^2y^2 + y^4) + c13(4x^4 - 4y^4 - 3x^2 + 3y^2) +$$
$$c14(6x^4 + 12x^2y^2 + 6y^4 - 6x^2 - 6y^2 + 1) +$$
$$c20(10yx^4 + 20x^2y^3 + 10y^5 - 12x^2y - 12y^3 + 3y) +$$
$$c21(15yx^4 + 10x^2y^3 - 5y^5 - 12x^2y + 4y^3) +$$
$$c22(5yx^4 - 10x^2y^3 + y^5) + c23(x^6 - 15x^4y^2 + 15x^2y^4 - y^6) +$$
$$c24(6x^6 - 30x^4y^2 - 30x^2y^4 + 6y^6 - 5x^4 + 30x^2y^2 - 5y^4) +$$
$$c25(15x^6 + 15x^4y^2 - 15x^2y^4 - 15y^6 - 20x^4 + 20y^4 + 6x^2 - 6y^2) +$$
$$c26(20x^6 + 60x^4y^2 + 60x^2y^4 + 20y^6 -$$
$$30x^4 - 60x^2y^2 - 30y^4 + 12x^2 + 12y^2 - 1)$$

In the above equation each of c1, c5, . . . , is a free surface coefficient. (Note: in the case of the free curved surfaces in the embodiments, there are coefficients associated with the paraxial axis among the free surface coefficients, and thus the values of the generating-line section curvature radius ry and the meridian-line section curvature radius rx on the general-paraxial axis do not agree with the actual generating-line section curvature radius ry and meridian-line section curvature radius rx on the vertex. Thus the tables also include the actual generating-line section curvature radius ry and meridian-line section curvature radius rx at the point (0, 0), i.e., on the vertex.)

The defining equation of the phase function of the rotationally asymmetric DOE of ADOE is given below. The below phase function $\phi(x,y)$ is added to the generating-line section curvature radius ry and meridian-line section curvature radius rx on the general-paraxial axis (ry=rx because the surface is a rotationally symmetric surface). (The calculation is made for the general-paraxial axis and for the local-paraxial axis on the assumption that the below phase function has no participation in the paraxial axis.)

$$\phi(x,y)=2\pi/\lambda(c3x^2+c5y^2+c7x^2y+c9y^3+c10x^4+c12x^2y^2+c14y^4+c16x^4+c18x^2y^3+C20y^5)$$

Each of c3, c5, . . . is a phase coefficient of rotationally asymmetric DOE. The order of diffraction is the negative first order and the reference wavelength $\lambda$ is 587.56 nm.

The base free curved surface of TDOE (toroidal surface) is a Y-toroidal surface as a result of revolution about the y-axis passing the center of curvature in the x-direction in the vertex coordinate system, and the phase function $\phi(R)$ of rotationally symmetric DOE described below is added onto the surface. (The calculation is also made for the general-paraxial axis and for the local-paraxial axis on the assumption that the below phase function has no participation in the paraxial axis.)

$$\phi(R)=2\pi/\lambda(c1R+c2R^2+c3R^3+c4R^4+c5R^5+c6R^6), R=x^2+y^2$$

Each of c1, c2, . . . is a phase coefficient of rotationally symmetric DOE. The order of diffraction is the negative first order and the reference wavelength is 587.56 nm.

TADOE is a surface resulting from addition of the above rotationally asymmetric DOE (ADOE) to the above Y-toroidal surface.

In the section of (local-paraxial axis) of each table there are the local curvature radii local-ry, local-rx, the local surface separation local-d (with an opposite sign for a reflecting surface), the local focal lengths local-fx, local-fy, and the refractive index nd of each surface (with an opposite sign for a reflecting surface). The tables also include hit point coordinates on each surface (with the vertex at 0, 0) and the local focal lengths and angles of view of the entire system.

Table 1 to Table 12 are presented below to indicate numerical examples of the Embodiments illustrated in FIG. 2 to FIG. 13. In Table 1 to Table 10 the traveling direction of rays is defined so that the rays emerge from the side of the observer 7 and then travel via the surface 4, the surface 8, the surface 4, and the surface 3 in the order named to enter the display means 1 (r6).

In the case of the seethrough systems of Table 11 and Table 12 the rays are incident thereto from the outside and then travel toward the observer 7.

TABLE 1

(general - paraxial axis)

| | n | ry | rx | d | shift | tilt | nd | vd |
|---|---|---|---|---|---|---|---|---|
| | 1 | 0.00000 | 0.00000 | 27.000 | 0.000 | 0.000 | 1.000 | |
| FFS | 2 | −176.74852 | −176.74852 | 6.177 | −12.252 | −12.325 | 1.571 | 33.80 |
| ADOE-M | 3 | −47.37794 | −47.37794 | −6.177 | −7.972 | −35.218 | −1.571 | 33.80 |
| FFS-M | 4 | −176.74852 | −176.74852 | 15.377 | −12.252 | −12.325 | 1.571 | 33.80 |
| FFS | 5 | −31.05322 | −31.05322 | 3.079 | 12.303 | 26.786 | 1.000 | |
| | 6 | 0.00000 | 0.00000 | 0.000 | 18.666 | 52.862 | 1.000 | |

| | | | | | | |
|---|---|---|---|---|---|---|
| FFS | 2 | c1 = 2.3725e+01 | c5 = 8.6249e−04 | c6 = −1.7301e−03 | c10 = −4.1334e−06 | c11 = −6.6768e−05 |
| | | c12 = −1.0639e−06 | c13 = 1.8716e−07 | c14 = 2.7578e−07 | c20 = −3.6303e−09 | c21 = −2.9055e−09 |
| | | c22 = 3.8002e−09 | | | | |
| ADOE | 3 | c3 = −4.9643e−06 | c5 = 1.5874e−03 | c7 = 1.3748e−05 | c9 = −1.3869e−04 | c10 = −2.6053e−07 |
| | | c12 = −5.9494e−06 | c14 = 2.4936e−06 | c16 = 8.3624e−08 | c18 = 3.3987e−07 | c20 = 5.1327e−08 |
| FFS | 4 | c1 = 2.3725e+01 | c5 = 8.6249e−04 | c6 = −1.7301e−03 | c10 = −4.1334e−06 | c11 = −6.6768e−05 |
| | | c12 = −1.0639e−06 | c13 = 1.8716e−07 | c14 = 2.7578e−07 | c20 = −3.6303e−09 | c21 = −2.9055e−09 |
| | | c22 = 3.8002e−09 | | | | |
| FFS | 5 | c1 = 0.0000e−00 | c5 = 2.1730e−02 | c6 = −5.5019e−03 | c10 = −1.0096e−06 | c11 = −6.1002e−05 |
| | | c12 = 9.9640e−08 | c13 = −1.8247e−06 | c14 = 1.9874e−06 | c20 = 6.7856e−09 | c21 = 8.8771e−09 |
| | | c22 = −4.5686e−07 | | | | |

| | n | point (y, x) | ry | rx |
|---|---|---|---|---|
| | 2 | (0.000, 0.000) | −69.905 | −92.102 |
| | 3 | (0.000, 0.000) | −47.378 | −47.378 |
| | 4 | (0.000, 0.000) | −69.905 | −92.102 |
| | 5 | (0.000, 0.000) | −10.235 | −92.910 |

(local - paraxial axis)

| | n | local-ry | local-rx | local-fy | local-fx | local-d | nd |
|---|---|---|---|---|---|---|---|
| FFS | 2 | −83.45809 | −71.17152 | −146.187 | −124.665 | 8.982 | 1.571 |
| ADOE-M | 3 | −47.37794 | −46.52882 | 15.080 | 14.810 | −13.312 | −1.571 |

TABLE 1-continued

| | | | | | | | |
|---|---|---|---|---|---|---|---|
| FFS-M | 4 | −64.55075 | −65.37311 | −20.546 | −20.808 | 10.967 | 1.571 |
| FFS | 5 | −25.66488 | −211.17992 | 44.955 | 369.907 | 0.000 | 1.000 |

| n | hitpoint (y, x) |
|---|---|
| 2 | (12,321, 0.000) |
| 3 | ( 8.930, 0.000) |
| 4 | (21.700, 0.000) |
| 5 | ( 9.028, 0.000) |

| local_fy(2-5) | local_fx(2-5) | 2Wy | 2Wx |
|---|---|---|---|
| 23.394 | 25.967 | 24.18 | 31.80 |

TABLE 2

(general - paraxial axis)

| | n | ry | rx | d | shift | tilt | nd | vd |
|---|---|---|---|---|---|---|---|---|
| | 1 | 0.00000 | 0.00000 | 27.000 | 0.000 | 0.000 | 1.000 | |
| FFS | 2 | −289.66977 | −289.66977 | 4.201 | −22.603 | −5.574 | 1.571 | 33.80 |
| FFS-M | 3 | −73.42792 | −73.42792 | −4.201 | −11.140 | −35.728 | −1.571 | 33.80 |
| FFS-M | 4 | −289.66977 | −289.66977 | 14.212 | −22.603 | −5.574 | 1.571 | 33.80 |
| ADOE | 5 | −515.16724 | −515.16724 | 1.010 | 16.981 | 63.711 | 1.000 | |
| | 6 | 0.00000 | 0.00000 | 0.000 | 22.636 | 45.093 | 1.000 | |

| | | | | | | |
|---|---|---|---|---|---|---|
| FFS | 2 | $c1 = 2.7560e+01$ | $c5 = 4.8070e-04$ | $c6 = -5.0019e-04$ | $c10 = 3.1837e-06$ | $c11 = -7.8407e-05$ |
| | | $c12 = -1.0689e-06$ | $c13 = -6.2272e-09$ | $c14 = 1.8792e-08$ | $c20 = -4.7621e-09$ | $c21 = -1.1061e-08$ |
| | | $c22 = -9.5219e-09$ | | | | |
| FFS | 3 | $c1 = 1.8585e+00$ | $c5 = -1.6847e-03$ | $c6 = -5.9935e-04$ | $c10 = -8.5086e-06$ | $c11 = 3.1815e-06$ |
| | | $c12 = -2.5163e-07$ | $c13 = -3.6452e-07$ | $c14 = -1.2746e-07$ | $c20 = 8.2944e-10$ | $c21 = 9.6046e-10$ |
| | | $c22 = 1.7213e-09$ | | | | |
| FFS | 4 | $c1 = 2.7560e+01$ | $c5 = 4.8070e-04$ | $c6 = -5.0019e-04$ | $c10 = 3.1837e-06$ | $c11 = -7.8407e-05$ |
| | | $c12 = -1.0689e-06$ | $c13 = -6.2272e-09$ | $c14 = 1.8792e-08$ | $c20 = -4.7621e-09$ | $c21 = -1.1061e-08$ |
| | | $c22 = -9.5219e-09$ | | | | |
| ADOE | 5 | $c3 = -2.1810e-03$ | $c5 = 1.9762e-03$ | $c7 = 7.8938e-04$ | $c9 = -6.0976e-04$ | $c10 = 3.5430e-05$ |
| | | $c12 = -9.3062e-05$ | $c14 = 7.3649e-05$ | $c16 = 1.5839e-06$ | $c18 = 2.8413e-06$ | $c20 = -2.3834e-06$ |

| n | point (y, x) | ry | rx |
|---|---|---|---|
| 2 | (0.000, 0.000) | −155.894 | −222.631 |
| 3 | (0.000, 0.000) | −79.067 | −51.595 |
| 4 | (0.000, 0.000) | −155.894 | −222.631 |
| 5 | (0.000, 0.000) | −515.167 | −515.167 |

(local - paraxial axis)

| | n | local-ry | local-rx | local-fy | local-fx | local-d | nd |
|---|---|---|---|---|---|---|---|
| FFS | 2 | −569.71206 | −92.53558 | −997.919 | −162.087 | 9.489 | 1.571 |
| FFS-M | 3 | −66.58683 | −49.04072 | 21.194 | 15.609 | −14.564 | −1.571 |
| FFS-M | 4 | −157.45637 | −71.26627 | −50.117 | −22.683 | 11.136 | 1.571 |
| ADOE | 5 | −515.16724 | −515.12797 | 902.377 | 902.308 | 0.000 | 1.000 |

| n | hitpoint (y, x) |
|---|---|
| 2 | (22.621, 0.000) |
| 3 | (12.784, 0.000) |
| 4 | (33.694, 0.000) |
| 5 | ( 6.360, 0.000) |

| local_fy(2-5) | local_fx(2-5) | 2Wy | 2Wx |
|---|---|---|---|
| 28.287 | 25.370 | 24.18 | 31.80 |

TABLE 3

(general - paraxial axis)

| | n | ry | rx | d | shift | tilt | nd | vd |
|---|---|---|---|---|---|---|---|---|
| | 1 | 0.00000 | 0.00000 | 27.000 | 0.000 | 0.000 | 1.000 | |
| FFS | 2 | −203.61204 | −203.61204 | 6.503 | −14.836 | −10.209 | 1.571 | 33.80 |

TABLE 3-continued

| | | | | | | | | |
|---|---|---|---|---|---|---|---|---|
| ADOE-M | 3 | −47.57081 | −47.57081 | −6.503 | −8.393 | −34.205 | −1.571 | 33.80 |
| FFS-M | 4 | −203.61204 | −203.61204 | 13.260 | −14.836 | −10.209 | 1.571 | 33.80 |
| ADOE | 5 | 683.94222 | 683.94222 | 0.251 | 14.748 | 63.890 | 1.000 | |
| | 6 | 0.00000 | 0.00000 | 0.000 | 21.040 | 45.179 | 1.000 | |

| | | | | | | |
|---|---|---|---|---|---|---|
| FFS | 2 | c1 = 1.1924e+01 | c5 = 5.4907e−04 | c6 = −1.1813e−03 | c10 = 7.2187e−07 | c11 = −7.6582e−05 |
| | | c12 = −1.1865e−06 | c13 = 3.1863e−07 | c14 = 2.1130e−07 | c20 = −4.5228e−09 | c21 = −2.5750e−09 |
| | | c22 = 7.6539e−09 | | | | |
| ADOE | 3 | c3 = 2.9927e−04 | c5 = −1.7133e−03 | c7 = −1.9787e−05 | c9 = −6.2670e−05 | c10 = −1.2487e−06 |
| | | c12 = −1.9254e−06 | c14 = 7.2466e−07 | c16 = 4.7778e−08 | c18 = 2.1587e−07 | c20 = 4.4878e−08 |
| FFS | 4 | c1 = 1.1924e+01 | c5 = 5.4907e−04 | c6 = −1.1813e−03 | c10 = 7.2187e−07 | c11 = −7.6582e−05 |
| | | c12 = 1.1865e−06 | c13 = 3.1863e−07 | c14 = 2.1130e−07 | c20 = −4.5228e−09 | c21 = 2.5750e−09 |
| | | c22 = 7.6539e−09 | | | | |
| ADOE | 5 | c3 = −2.1435e−03 | c5 = 1.7343e−02 | c7 = 4.6698e−04 | c9 = −7.1176e−04 | c10 = 3.6786e−05 |
| | | c12 = −5.5007e−05 | c14 = 6.3165e−05 | c16 = −8.1266e−07 | c18 = 1.8600e−08 | c20 = −2.2823e−06 |

| n | point (y, x) | ry | rx |
|---|---|---|---|
| 2 | (0.000, 0.000) | −93.152 | −117.058 |
| 3 | (0.000, 0.000) | −47.571 | −47.571 |
| 4 | (0.000, 0.000) | −93.152 | −117.058 |
| 5 | (0.000, 0.000) | 683.942 | 683.942 |

(local - paraxial axis)

| | n | local-ry | local-rx | local-fy | local-fx | local-d | nd |
|---|---|---|---|---|---|---|---|
| FFS | 2 | −113.28223 | −80.07484 | −198.427 | −140.261 | 9.344 | 1.571 |
| ADOE-M | 3 | −47.57081 | −46.64739 | 15.141 | 14.847 | −13.636 | −1.571 |
| FFS-M | 4 | −65.27212 | −69.94823 | −20.775 | −22.264 | 9.807 | 1.571 |
| ADOE | 5 | 683.94222 | 683.91056 | −1198.007 | −1197.951 | 0.000 | 1.000 |

| n | hitpoint (y, x) |
|---|---|
| 2 | (14.891, 0.000) |
| 3 | ( 9.328, 0.000) |
| 4 | (24.467, 0.000) |
| 5 | ( 6.580, 0.000) |

| local_fy(2-5) | local_fx(2-5) | 2Wy | 2Wx |
|---|---|---|---|
| 25.299 | 24.600 | 24.18 | 31.80 |

TABLE 4

(general - paraxial axis)

| | n | ry | rx | d | shift | tilt | nd | vd |
|---|---|---|---|---|---|---|---|---|
| | 1 | 0.00000 | 0.00000 | 23.610 | 0.000 | 0.000 | 1.000 | |
| FFS | 2 | −618.77538 | −618.77538 | 10.904 | −5.132 | 1.337 | 1.571 | 33.80 |
| FFS-M | 3 | −0.22715 | −0.22715 | −10.904 | −0.689 | −22.780 | −1.571 | 33.80 |
| FFS-M | 4 | −618.77538 | −618.77538 | 10.808 | −5.132 | 1.337 | 1.571 | 33.80 |
| ADOE | 5 | −65.00757 | −65.00757 | 2.580 | 20.635 | 56.277 | 1.000 | |
| | 6 | 0.00000 | 0.00000 | 0.586 | 21.798 | 42.881 | 1.492 | 57.40 |
| | 7 | 0.00000 | 0.00000 | 0.293 | 22.343 | 42.881 | 1.000 | |
| | 8 | 0.00000 | 0.00000 | 0.586 | 22.615 | 42.881 | 1.523 | 58.60 |
| | 9 | 0.00000 | 0.00000 | 0.000 | 23.159 | 42.881 | 1.000 | |
| | 10 | 0.00000 | 0.00000 | 0.000 | 23.159 | 42.881 | 1.000 | |

| | | | | | | |
|---|---|---|---|---|---|---|
| FFS | 2 | c1 = 3.5680e+02 | c5 = −2.0567e−03 | c6 = −1.0405e−03 | c10 = 8.3999e−06 | c11 = 1.5013e−05 |
| | | c12 = 1.0844e−06 | c13 = −1.0166e−07 | c14 = −3.7626e−08 | c20 = −6.0737e−09 | c21 = 3.9030e−09 |
| | | c22 = −1.4936e−08 | c23 = −1.3351e−10 | c24 = 2.4507e−11 | c25 = −5.5645e−11 | c26 = 1.5400e−11 |
| FFS | 3 | c1 = −1.2714e+13 | c5 = −1.2149e−03 | c6 = −3.9572e−03 | c10 = −3.5802e−06 | c11 = 3.7393e−06 |
| | | c12 = 1.4720e−07 | c13 = −9.3674e−08 | c14 = −7.6268e−08 | c20 = 1.6052e−09 | c21 = −6.1627e−10 |
| | | c22 = −3.6139e−09 | c23 = −6.6590e−11 | c24 = −1.7209e−11 | c25 = 8.6865e−11 | c26 = −6.6983e−11 |
| FFS | 4 | c1 = 3.5680e+02 | c5 = −2.0567e−03 | c6 = −1.0405e−03 | c10 = 8.3999e−06 | c11 = 1.5013e−05 |
| | | c12 = 1.0844e−06 | c13 = −1.0166e−07 | c14 = −3.7626e−08 | c20 = −6.0737e−09 | c21 = 3.9030e−09 |
| | | c22 = −1.4936e−08 | c23 = −1.3351e−10 | c24 = 2.4507e−11 | c25 = −5.5645e−11 | c26 = 1.5400e−11 |
| ADOE | 5 | c3 = 1.9670e−03 | c5 = −1.7180e−03 | c7 = 5.0176e−05 | c9 = 2.3197e−04 | c10 = −4.8602e−17 |
| | | c12 = −8.1302e−16 | c14 = −2.8743e−17 | c16 = 1.3260e−20 | c18 = 1.2599e−20 | c20 = 1.2709e−20 |
| | | c21 = 1.2709e−20 | c23 = 1.2709e−20 | c25 = 1.2709e−20 | c27 = 1.2709e−20 | |

| n | point (y, x) | ry | rx |
|---|---|---|---|
| 2 | (0.000, 0.000) | −600.749 | −101.109 |

TABLE 4-continued

|   | 3 | (0.000, 0.000) | −74.117 | −54.494 |
|---|---|---|---|---|
|   | 4 | (0.000, 0.000) | −600.749 | −101.109 |
|   | 5 | (0.000, 0.000) | −65.008 | −65.008 |

| (local - paraxial axis) | | | | | | | |
|---|---|---|---|---|---|---|---|
|   | n | local-ry | local-rx | local-fy | local-fx | local-d | nd |
| FFS | 2 | −807.82884 | −104.83060 | −1415.009 | −183.623 | 11.386 | 1.571 |
| FFS-M | 3 | −74.22761 | −54.76664 | 23.626 | 17.432 | −16.709 | −1.571 |
| FFS-M | 4 | −331.76743 | −88.34080 | −105.598 | −28.118 | 13.574 | 1.571 |
| ADOE | 5 | −65.00757 | −64.92348 | 113.869 | 113.721 | 0.000 | 1.000 |

| n | hitpoint (y, x) |
|---|---|
| 2 | ( 5.134, 0.000) |
| 3 | ( 0.885, 0.000) |
| 4 | (17.051, 0.000) |
| 5 | ( 3.305, 0.000) |

| local_fy(2-5) | local_fx(2-5) | 2Wy | 2Wx |
|---|---|---|---|
| 25.854 | 25.693 | 36.12 | 47.00 |

TABLE 5

| (general - paraxial axis) | | | | | | | | |
|---|---|---|---|---|---|---|---|---|
|   | n | ry | rx | d | shift | tilt | nd | vd |
|   | 1 | 0.00000 | 0.00000 | 25.491 | 0.000 | 0.000 | 1.000 |   |
| FFS | 2 | −680.65988 | −680.65988 | 7.188 | −5.478 | 4.278 | 1.571 | 33.80 |
| ADOE-M | 3 | −59.06734 | −59.06734 | −7.188 | −9.757 | −27.798 | −1.571 | 33.80 |
| FFS-M | 4 | −680.65988 | −680.65988 | 14.195 | −5.478 | 4.278 | 1.571 | 33.80 |
| ADOE | 5 | −87.49555 | −87.49555 | −4.290 | 17.446 | 55.829 | 1.000 |   |
|   | 6 | 0.00000 | 0.00000 | 0.533 | 21.809 | 48.251 | 1.492 | 57.40 |
|   | 7 | 0.00000 | 0.00000 | 0.266 | 22.406 | 48.251 | 1.000 |   |
|   | 8 | 0.00000 | 0.00000 | 0.533 | 22.704 | 48.251 | 1.523 | 58.60 |
|   | 9 | 0.00000 | 0.00000 | 0.000 | 23.301 | 48.251 | 1.000 |   |
|   | 10 | 0.00000 | 0.00000 | 0.000 | 23.301 | 48.251 | 1.000 |   |

| FFS | 2 | $c_1$ = 3.0081e+02 | $c_5$ = −7.6548e−04 | $c_6$ = −1.4551e−03 | $c_{10}$ = 1.0298e−05 | $c_{11}$ = 1.8089e−05 |
|---|---|---|---|---|---|---|
|   |   | $c_{12}$ = 1.5611e−06 | $c_{13}$ = 2.0273e−08 | $c_{14}$ = 2.3274e−08 | $c_{20}$ = −7.2302e−09 | $c_{21}$ = 6.1917e−09 |
|   |   | $c_{22}$ = −2.4587e−08 | $c_{23}$ = −2.0895e−10 | $c_{24}$ = 1.0648e−11 | $c_{25}$ = 5.8286e−11 | $c_{26}$ = 2.7870e−11 |
| ADOE | 3 | $c_3$ = 1.3309e−03 | $c_5$ = −2.3339e−04 | $c_7$ = −1.5995e−04 | $c_9$ = −1.6753e−04 | $c_{10}$ = −1.6818e−06 |
|   |   | $c_{12}$ = 1.1571e−05 | $c_{14}$ = 7.9298e−06 | $c_{16}$ = 1.2496e−07 | $c_{18}$ = −4.4866e−07 | $c_{20}$ = −2.5785e−07 |
|   |   | $c_{21}$ = −2.5785e−07 | $c_{23}$ = −2.5785e−07 | $c_{25}$ = −2.5785e−07 | $c_{27}$ = −2.5785e−07 |   |
| FFS | 4 | $c_1$ = 3.0081e+02 | $c_5$ = −7.6548e−04 | $c_6$ = −1.4551e−03 | $c_{10}$ = 1.0298e−05 | $c_{11}$ = 1.8089e−05 |
|   |   | $c_{12}$ = 1.5611e−06 | $c_{13}$ = 2.0273e−08 | $c_{14}$ = 2.3274e−08 | $c_{20}$ = −7.2302e−09 | $c_{21}$ = 6.1917e−09 |
|   |   | $c_{22}$ = −2.4587e−08 | $c_{23}$ = −2.0895e−10 | $c_{24}$ = 1.0648e−11 | $c_{25}$ = −5.8286e−11 | $c_{26}$ = 2.7870e−11 |
| ADOE | 5 | $c_3$ = −6.0150e−03 | $c_5$ = 1.5397e−03 | $c_7$ = 4.4905e−04 | $c_9$ = 6.8464e−04 | $c_{10}$ = 2.5819e−05 |
|   |   | $c_{12}$ = 3.8922e−05 | $c_{14}$ = −2.4952e−05 | $c_{15}$ = −2.4157e−06 | $c_{18}$ = −4.7939e−06 | $c_{20}$ = 1.0338e−06 |
|   |   | $c_{21}$ = 1.0338e−06 | $c_{23}$ = 1.0338e−06 | $c_{25}$ = 1.0338e−06 | $c_{27}$ = 1.0338e−06 |   |

| n | point (y, x) | ry | rx |
|---|---|---|---|
| 2 | (0.000, 0.000) | −173.649 | −113.367 |
| 3 | (0.000, 0.000) | −59.067 | −59.067 |
| 4 | (0.000, 0.000) | −173.649 | −113.367 |
| 5 | (0.000, 0.000) | −87.496 | −87.496 |

| (local - paraxial axis) | | | | | | | |
|---|---|---|---|---|---|---|---|
|   | n | local-ry | local-rx | local-fy | local-fx | local-d | nd |
| FFS | 2 | −193.74103 | −119.10593 | −339.361 | −208.628 | 11.905 | 1.571 |
| ADOE-M | 3 | −59.06734 | −58.03440 | 18.880 | 18.472 | −16.906 | −1.571 |
| FFS-M | 4 | −137.98617 | −102.49540 | −43.919 | −32.623 | 13.987 | 1.571 |
| ADOE | 5 | −87.49555 | −86.93351 | 153.259 | 152.274 | 0.000 | 1.000 |

| n | hitpoint (y, x) |
|---|---|
| 2 | ( 5.499, 0.000) |
| 3 | (10.998, 0.000) |

TABLE 5-continued

| | |
|---|---|
| 4 | (16.041, 0.000) |
| 5 | ( 9.901, 0.000) |

| local_fy(2-5) | local_fx(2-5) | 2Wy | 2Wx |
|---|---|---|---|
| 24.127 | 26.654 | 36.12 | 47.00 |

TABLE 6

(general - paraxial axis)

| | n | ry | rx | d | shift | tilt | nd | vd |
|---|---|---|---|---|---|---|---|---|
| | 1 | 0.00000 | 0.00000 | 23.438 | 0.000 | 0.000 | 1.000 | |
| FFS | 2 | −677.90873 | −677.90873 | 9.876 | −7.021 | 7.093 | 1.571 | 33.80 |
| FFS-M | 3 | −0.22716 | −0.22716 | −9.786 | −0.857 | −20.957 | −1.571 | 33.80 |
| FFS-M | 4 | −677.90873 | −677.90873 | 12.115 | −7.021 | 7.093 | 1.571 | 33.80 |
| FFS | 5 | −35.64215 | −35.64215 | 1.699 | 18.936 | 67.136 | 1.000 | |
| | 6 | 0.00000 | 0.00000 | 0.575 | 20.035 | 44.047 | 1.492 | 57.40 |
| ADOE | 7 | 0.00000 | 0.00000 | 0.288 | 20.591 | 44.047 | 1.000 | |
| | 8 | 0.00000 | 0.00000 | 0.575 | 20.869 | 44.047 | 1.523 | 58.60 |
| | 9 | 0.00000 | 0.00000 | 0.000 | 21.425 | 44.047 | 1.000 | |
| | 10 | 0.00000 | 0.00000 | 0.000 | 21.425 | 44.047 | 1.000 | |

| | | | | | | |
|---|---|---|---|---|---|---|
| FFS | 2 | $c_1$ = 3.8333e+02 | $c_5$ = −1.8399e−03 | $c_6$ = 2.2523e−05 | $c_{10}$ = 5.0804e−06 | $c_{11}$ = −7.7074e−06 |
| | | $c_{12}$ = 1.2262e−06 | $c_{13}$ = −3.5880e−09 | $c_{14}$ = −1.0192e−07 | $c_{20}$ = −7.6812e−09 | $c_{21}$ = 3.2584e−09 |
| | | $c_{22}$ = −2.2988e−08 | $c_{23}$ = −2.3588e−10 | $c_{24}$ = −1.4299e−11 | $c_{25}$ = −7.5424e−11 | $c_{26}$ = 4.3389e−11 |
| FFS | 3 | $c_1$ = −1.2714e+13 | $c_5$ = −1.4047e−03 | $c_6$ = −3.5402e−03 | $c_{10}$ = −1.2939e−05 | $c_{11}$ = 2.3318e−06 |
| | | $c_{12}$ = 1.2152e−07 | $c_1$ = −2.1246e−07 | $c_{14}$ = 5.5353e−08 | $c_{20}$ = 2.1977e−09 | $c_{21}$ = −2.3904e−09 |
| | | $c_{22}$ = −3.0865e−09 | $c_{23}$ = −5.8899e−11 | $c_{24}$ = −6.1296e−11 | $c_{25}$ = 1.6208e−10 | $c_{26}$ = −9.4703e−11 |
| FFS | 4 | $c_1$ = 3.8333e+02 | $c_5$ = −1.8399e−03 | $c_6$ = 2.2523e−05 | $c_{10}$ = 5.0804e−06 | $c_{11}$ = −7.7074e−06 |
| | | $c_{12}$ = 1.2262e−06 | $c_{13}$ = −3.5880e−09 | $c_{14}$ = −1.0192e−07 | $c_{20}$ = −7.6812e−09 | $c_{21}$ = 3.2584e−09 |
| | | $c_{22}$ = −2.2988e−08 | $c_{23}$ = −2.3588e−10 | $c_{24}$ = −1.4299e−11 | $c_{25}$ = −7.5424e−11 | $c_{26}$ = 4.3389e−11 |
| FFS | 5 | $c_1$ = 0.0000e+00 | $c_5$ = −2.3384e−02 | $c_6$ = 1.8957e−02 | $c_{10}$ = −1.4583e−03 | $c_{11}$ = 3.6039e−04 |
| | | $c_{12}$ = −5.0588e−06 | $c_{13}$ = −1.7458e−05 | $c_{14}$ = 9.2279e−06 | $c_{20}$ = 3.3466e−07 | $c_{21}$ = 1.3589e−07 |
| | | $c_{22}$ = 3.7884e−07 | $c_{23}$ = 6.7516e−09 | $c_{24}$ = 6.5858e−10 | $c_{25}$ = 2.7712e−09 | $c_{25}$ = −4.1609e−09 |
| ADOE | 7 | $c_3$ = 5.4519e−10 | $c_5$ = 2.1940e−09 | $c_7$ = −1.4662e−15 | $c_9$ = 3.1068e−15 | $c_{10}$ = 4.6949e−26 |
| | | $c_{12}$ = −2.5644e−22 | $c_{14}$ = 1.6555e−21 | $c_{16}$ = −1.0352e−33 | $c_{18}$ = 2.2336e−33 | $c_{20}$ = 1.6121e−33 |

| n | point (y, x) | ry | rx |
|---|---|---|---|
| 2 | (0.000, 0.000) | 435.560 | −197.491 |
| 3 | (0.000, 0.000) | −87.358 | −58.606 |
| 4 | (0.000, 0.000) | 435.560 | −197.491 |
| 5 | (0.000, 0.000) | 10.602 | 1004.645 |
| 6 | (0.000, 0.000) | 0.000 | 0.000 |
| 7 | (0.000, 0.000) | 0.000 | 0.000 |

(local - paraxial axis)

| | n | local-ry | local-rx | local-fy | local-fx | local-d | nd |
|---|---|---|---|---|---|---|---|
| FFS | 2 | 345.90054 | −167.12855 | 605.886 | −292.746 | 11.085 | 1.571 |
| FFS-M | 3 | −85.78734 | −58.62726 | 27.305 | 18.660 | −16.410 | −1.571 |
| FFS-M | 4 | −1371.78946 | −99.92406 | −436.625 | −31.805 | 13.697 | 1.571 |
| FFS | 5 | −50.09742 | −34.77967 | 87.752 | 60.921 | 3.687 | 1.000 |
| | 6 | 0.00000 | 0.00000 | 0.000 | 0.000 | 0.801 | 1.492 |
| ADOE | 7 | 0.00000 | 0.00000 | 0.000 | 0.000 | 0.000 | 1.000 |

| n | hitpoint (y, x) |
|---|---|
| 2 | ( 7.067, 0.000) |
| 3 | ( 1.368, 0.000) |
| 4 | (18.577, 0.000) |
| 5 | ( 6.466, 0.000) |
| 6 | ( 7.022, 0.000) |
| 7 | ( 7.069, 0.000) |

| local_fy(2-7) | local_fx(2-7) | 2Wy | 2Wx |
|---|---|---|---|
| 25.239 | 25.656 | 36.12 | 47.00 |

| local_fy(2-5) | local_fx(2-5) |
|---|---|
| 25.239 | 25.656 |

TABLE 7

| | | | | (general - paraxial axis) | | | | |
|---|---|---|---|---|---|---|---|---|
| | n | ry | rx | d | shift | tilt | nd | vd |
| | 1 | 0.00000 | 0.00000 | 19.014 | 0.000 | 0.000 | 1.000 | |
| | 2 | 41.91813 | 41.91813 | 5.464 | 0.000 | 0.000 | 1.492 | 57.40 |
| ADOE | 3 | 0.00000 | 0.00000 | 0.840 | 0.000 | 0.000 | 1.000 | |
| FFS | 4 | −659.49349 | −659.49349 | 10.766 | −9.711 | −0.469 | 1.571 | 33.80 |
| FFS-M | 5 | −0.22716 | −0.22716 | −10.766 | 0.435 | −24.255 | −1.571 | 33.80 |
| FFS-M | 6 | −659.49349 | −659.49349 | 14.744 | −9.711 | −0.469 | 1.571 | 33.80 |
| FFS | 7 | −25.84916 | −25.84916 | 0.438 | 14.976 | 49.941 | 1.000 | |
| | 8 | 0.00000 | 0.00000 | 0.613 | 16.558 | 40.000 | 1.492 | 57.40 |
| | 9 | 0.00000 | 0.00000 | 0.306 | 17.072 | 40.000 | 1.000 | |
| | 10 | 0.00000 | 0.00000 | 0.613 | 17.329 | 40.000 | 1.523 | 58.60 |
| | 11 | 0.00000 | 0.00000 | 0.000 | 17.843 | 40.000 | 1.000 | |
| | 12 | 0.00000 | 0.00000 | 0.000 | 17.843 | 40.000 | 1.000 | |

| | | | | | | |
|---|---|---|---|---|---|---|
| ADOE | 3 | $c_3$ = 1.0825e−01 | $c_5$ = 8.9597e−04 | $c_7$ = 1.4831e−05 | $c_9$ = 4.5499e−05 | $c_{10}$ = −6.7914e−07 |
| | | $c_{12}$ = −1.4083e−06 | $c_{14}$ = −4.7814e−07 | $c_{16}$ = −2.9705e−08 | $c_{18}$ = −6.5191e−08 | $c_{20}$ = −2.0559e−07 |
| FFS | 4 | $c_1$ = 3.4411e+02 | $c_5$ = −7.2403e−04 | $c_6$ = 2.0775e−05 | $c_{10}$ = 1.3636e−05 | $c_{11}$ = 9.9842e−06 |
| | | $c_{12}$ = 1.2751e−06 | $c_{13}$ = −1.0716e−08 | $c_{14}$ = −1.4459e−07 | $c_{20}$ = −4.3096e−09 | $c_{21}$ = 1.7287e−09 |
| | | $c_{22}$ = −9.8764e−09 | $c_{23}$ = −5.7425e−11 | $c_{24}$ = −3.6437e−11 | $c_{25}$ = −4.9906e−11 | $c_{26}$ = 2.6801e−11 |
| FFS | 5 | $c_1$ = −1.2714e+13 | $c_5$ = −9.9617e−04 | $c_6$ = −2.5856e−03 | $c_{10}$ = −4.2450e−06 | $c_{11}$ = −1.1360e−05 |
| | | $c_{12}$ = 8.5254e−08 | $c_{13}$ = 5.7248e−08 | $c_{14}$ = 1.5195e−07 | $c_{20}$ = −6.6252e−09 | $c_{21}$ = 5.2762e−09 |
| | | $c_{22}$ = −6.9366e−09 | $c_{23}$ = −5.7008e−11 | $c_{24}$ = −1.0384e−10 | $c_{25}$ = 1.2595e−10 | $c_{26}$ = −1.3857e−10 |
| FFS | 6 | $c_1$ = 3.4411e+02 | $c_5$ = −7.2403e−04 | $c_6$ = 2.0775e−05 | $c_{10}$ = 1.3636e−05 | $c_{11}$ = 9.9842e−06 |
| | | $c_{12}$ = 1.2751e−06 | $c_{13}$ = −1.0716e−08 | $c_{14}$ = −1.4459e−07 | $c_{20}$ = −4.3096e−09 | $c_{21}$ = 1.7287e−09 |
| | | $c_{22}$ = −9.8764e−09 | $c_{23}$ = −5.7425e−11 | $c_{24}$ = −3.6437e−11 | $c_{25}$ = −4.9906e−11 | $c_{26}$ = 2.6801e−11 |
| FFS | 7 | $c_1$ = −9.9235e−01 | $c_5$ = −1.4259e−02 | $c_6$ = 1.5695e−02 | $c_{10}$ = −1.1712e−03 | $c_{11}$ = −3.0731e−04 |
| | | $c_{12}$ = −2.1955e−05 | $c_{13}$ = −6.5102e−06 | $c_{14}$ = 1.3432e−05 | $c_{20}$ = 1.9315e−07 | $c_{21}$ = −3.8013e−07 |
| | | $c_{22}$ = 5.9959e−07 | $c_{23}$ = 1.0721e−08 | $c_{24}$ = −5.3552e−09 | $c_{25}$ = 9.46423e−09 | $c_{26}$ = −2.0870e−09 |

| n | point (y, x) | ry | rx |
|---|---|---|---|
| 2 | (0.000, 0.000) | 41.918 | 41.918 |
| 3 | (0.000, 0.000) | 0.000 | 0.000 |
| 4 | (0.000, 0.000) | 60530.445 | −347.285 |
| 5 | (0.000, 0.000) | −118.410 | −80.447 |
| 6 | (0.000, 0.000) | 60530.445 | −347.285 |
| 7 | (0.000, 0.000) | 19.080 | −220.034 |

| | | | (local - paraxial axis) | | | |
|---|---|---|---|---|---|---|
| | n | local-ry | local-rx | local-fy | local-fx | local-d | nd |
| | 2 | 41.91813 | 41.91813 | 85.250 | 85.250 | 5.464 | 1.492 |
| ADOE | 3 | 0.00000 | 0.00000 | 0.000 | 0.000 | 0.947 | 1.000 |
| FFS | 4 | 761.52233 | −309.31569 | 1333.898 | −541.803 | 10.437 | 1.571 |
| FFS-M | 5 | −119.84253 | −81.39342 | 38.145 | 25.907 | −15.423 | −1.571 |
| FFS-M | 6 | 68555.76740 | −141.06110 | 21820.536 | −44.898 | 12.396 | 1.571 |
| FFS | 7 | −52.86787 | −23.02595 | 92.604 | 40.333 | 0.000 | 1.000 |

| n | hitpoint (y, x) |
|---|---|
| 2 | ( 0.000, 0.000) |
| 3 | ( 0.000, 0.000) |
| 4 | ( 9.712, 0.000) |
| 5 | (−0.543, 0.000) |
| 6 | (21.240, 0.000) |
| 7 | ( 7.871, 0.000) |

| local_fy(2-7) | local_fx(2-7) | 2Wy | 2Wx |
|---|---|---|---|
| 26.519 | 26.025 | 36.12 | 47.00 |

| local_fy(2-3) | local_fx(2-3) |
|---|---|
| 85.250 | 85.250 |

| local_fy(4-7) | local_fx(4-7) |
|---|---|
| 30.789 | 29.075 |

TABLE 8

(general - paraxial axis)

|   | n | ry | rx | d | shift | tilt | nd | vd |
|---|---|---|---|---|---|---|---|---|
|   | 1 | 0.00000 | 0.00000 | 22.460 | 0.000 | 0.000 | 1.000 |   |
| FFS | 2 | −643.96375 | −643.96375 | 11.966 | −6.923 | −3.458 | 1.571 | 33.80 |
| FFS-M | 3 | −0.22716 | −0.22716 | −11.966 | 0.344 | −23.623 | −1.571 | 33.80 |
| FFS-M | 4 | −643.96375 | −643.96375 | 15.395 | −6.923 | −3.458 | 1.571 | 33.80 |
| TDOE | 5 | −73.09634 | −48.49055 | 0.921 | 17.406 | 50.808 | 1.000 |   |
|   | 6 | 0.00000 | 0.00000 | 0.613 | 18.559 | 40.000 | 1.492 | 57.40 |
|   | 7 | 0.00000 | 0.00000 | 0.306 | 19.074 | 40.000 | 1.000 |   |
|   | 8 | 0.00000 | 0.00000 | 0.613 | 19.331 | 40.000 | 1.523 | 58.60 |
|   | 9 | 0.00000 | 0.00000 | 0.000 | 19.845 | 40.000 | 1.000 |   |
|   | 10 | 0.00000 | 0.00000 | 0.000 | 19.845 | 40.000 | 1.000 |   |

| FFS | 2 | $c1 = 3.5862e+02$ | $c5 = -1.2167e-03$ | $c6 = -1.8851e-03$ | $c10 = 4.2496e-05$ | $c11 = 2.0449e-05$ |
|---|---|---|---|---|---|---|
|   |   | $c12 = 2.2205e-06$ | $c13 = 8.0214e-08$ | $c14 = -2.4812e-07$ | $c20 = -7.8203e-09$ | $c21 = 8.5900e-09$ |
|   |   | $c22 = -3.0550e-08$ | $c23 = -1.7633e-10$ | $c24 = 5.1325e-11$ | $c25 = -9.1276e-11$ | $c25 = 4.1268e-11$ |
| FFS | 3 | $c1 = -1.2714e+13$ | $c5 = -1.2081e-03$ | $c6 = -4.1176e-03$ | $c10 = -1.3134e-06$ | $c11 = -9.9438e-07$ |
|   |   | $c12 = 1.2615e-07$ | $c13 = -7.8422e-08$ | $c14 = 6.2902e-08$ | $c20 = 9.7017e-10$ | $c21 = -1.1462e-09$ |
|   |   | $c22 = -5.4106e-09$ | $c23 = -7.9075e-11$ | $c24 = -5.3387e-11$ | $c25 = 1.5922e-10$ | $c26 = -1.0132e-10$ |
| FFS | 4 | $c1 = 3.5862e+02$ | $c5 = -1.2167e-03$ | $c6 = -1.8851e-03$ | $c10 = 4.2496e-05$ | $c11 = 2.0449e-05$ |
|   |   | $c12 = 2.2205e-06$ | $c13 = 8.0214e-08$ | $c14 = -2.4812e-07$ | $c20 = -7.8203e-09$ | $c21 = 8.5900e-09$ |
|   |   | $c22 = -3.0550e-08$ | $c23 = -1.7633e-10$ | $c24 = 5.1325e-11$ | $c25 = -9.1276e-11$ | $c26 = 4.1268e-11$ |
| TDOE | 5 | $c1 = -1.4134e-03$ | $c2 = 1.6748e-05$ | $c3 = -2.6722e-08$ | $c4 = -1.8996e-11$ | $c5 = 6.9216e-14$ |
|   |   | $c6 = -2.1980e-17$ |   |   |   |   |

| n | point (y, x) | ry | rx |
|---|---|---|---|
| 2 | (0.000, 0.000) | −150.231 | −86.774 |
| 3 | (0.000, 0.000) | −70.685 | −52.691 |
| 4 | (0.000, 0.000) | −150.231 | −86.774 |
| 5 | (0.000, 0.000) | −73.096 | −48.491 |

(local - paraxial axis)

|   | n | local-ry | local-rx | local-fy | local-fx | local-d | nd |
|---|---|---|---|---|---|---|---|
| FFS | 2 | −346.19679 | −96.60549 | −606.405 | −169.216 | 11.473 | 1.571 |
| FFS-M | 3 | −71.20658 | −52.96739 | 22.664 | 16.859 | −16.727 | −1.571 |
| FFS-M | 4 | −237.30643 | −74.87662 | −75.532 | −23.832 | 13.083 | 1.571 |
| TDOE | 5 | −73.09634 | −48.08947 | 128.037 | 84.234 | 0.000 | 1.000 |

| n | hitpoint (y, x) |
|---|---|
| 2 | ( 6.928, 0.000) |
| 3 | (−0.504, 0.000) |
| 4 | (19.123, 0.000) |
| 5 | ( 7.647, 0.000) |

| local_fy(2-5) | local_fx(2-5) | 2Wy | 2Wx |
|---|---|---|---|
| 26.542 | 25.752 | 36.12 | 47.00 |

TABLE 9

(general - paraxial axis)

|   | n | ry | rx | d | shift | tilt | nd | vd |
|---|---|---|---|---|---|---|---|---|
|   | 1 | 0.00000 | 0.00000 | 24.155 | 0.000 | 0.000 | 1.000 |   |
| FFS | 2 | −1776.45683 | −1776.45683 | 9.154 | −2.777 | 4.531 | 1.571 | 33.80 |
| TDOE-M | 3 | −65.44615 | −55.81479 | −9.154 | −4.192 | −23.410 | −1.571 | 33.80 |
| FFS-M | 4 | −1776.45683 | −1776.45683 | 8.820 | −2.777 | 4.531 | 1.571 | 33.80 |
| FFS | 5 | −25.47555 | −25.47555 | 2.535 | 21.661 | 57.947 | 1.000 |   |
|   | 6 | 0.00000 | 0.00000 | 0.513 | 21.761 | 50.069 | 1.492 | 57.40 |
|   | 7 | 0.00000 | 0.00000 | 0.257 | 22.375 | 50.069 | 1.000 |   |
|   | 8 | 0.00000 | 0.00000 | 0.513 | 22.681 | 50.069 | 1.523 | 58.60 |
|   | 9 | 0.00000 | 0.00000 | 0.000 | 23.295 | 50.069 | 1.000 |   |
|   | 10 | 0.00000 | 0.00000 | 0.000 | 23.295 | 50.069 | 1.000 |   |

| FFS | 2 | $c1 = -2.7827e+02$ | $c5 = -1.2085e-03$ | $c6 = -1.3561e-03$ | $c10 = -7.5345e-06$ | $c11 = -1.5981e-06$ |
|---|---|---|---|---|---|---|
|   |   | $c12 = 7.5079e-07$ | $c13 = -8.2741e-08$ | $c13 = 5.3335e-08$ | $c20 = -8.4435e-09$ | $c21 = 1.3519e-09$ |
|   |   | $c22 = -1.1549e-08$ | $c23 = -4.0211e-10$ | $c24 = -1.4648e-10$ | $c25 = -6.3011e-11$ | $c26 = 3.9127e-11$ |
| TDOE | 3 | $c1 = 2.7150e-04$ | $c2 = -4.2736e-08$ | $c3 = 9.5516e-11$ | $c4 = 5.6608e-13$ | $c5 = 6.5541e-16$ |
|   |   | $c6 = -9.6634e-19$ |   |   |   |   |

TABLE 9-continued

| | | | | | | |
|---|---|---|---|---|---|---|
| FFS | 4 | $c1 = -2.7827e+02$ | $c5 = -1.2085e-03$ | $c6 = -1.3561e-03$ | $c10 = -7.5345e-06$ | $c11 = -1.5981e-06$ |
| | | $c12 = 7.5079e-07$ | $c13 = -8.2741e-08$ | $c14 = 5.3335e-08$ | $c20 = -8.4435e-09$ | $c21 = 1.3519e-09$ |
| | | $c22 = -1.1549e-08$ | $c23 = -4.0211e-10$ | $c24 = -1.4648e-10$ | $c25 = -6.3014e-11$ | $c26 = 3.9127e-11$ |
| FFS | 5 | $c1 = -7.4024e+00$ | $c5 = 1.9749e-03$ | $c6 = 8.1737e-04$ | $c10 = -2.2206e-04$ | $c11 = 2.5737e-05$ |
| | | $c12 = 1.5371e-05$ | $c13 = 2.9309e-06$ | $c14 = 7.0794e-06$ | $c20 = -1.5930e-07$ | $c21 = 3.0541e-07$ |
| | | $c22 = -5.2211e-07$ | $c23 = -2.3741e-08$ | $c24 = -8.6073e-10$ | $c25 = -1.2590e-08$ | $c26 = -6.9644e-10$ |

| n | point (y, x) | ry | rx |
|---|---|---|---|
| 2 | (0.000, 0.000) | −280.000 | −118.986 |
| 3 | (0.000, 0.000) | −65.446 | −55.815 |
| 4 | (0.000, 0.000) | −280.000 | −118.986 |
| 5 | (0.000, 0.000) | −24.999 | −31.117 |

(local - paraxial axis)

| | n | local-ry | local-rx | local-fy | local-fx | local-d | nd |
|---|---|---|---|---|---|---|---|
| FFS | 2 | −261.00362 | −116.03669 | −457.179 | −203.252 | 11.167 | 1.571 |
| TDOE-M | 3 | −65.44615 | −55.63222 | 20.831 | 17.707 | −16.159 | −1.571 |
| FFS-M | 4 | −166.40041 | −93.78335 | −52.963 | −29.850 | 14.579 | 1.571 |
| FFS | 5 | −22.86363 | −29.53390 | 40.048 | 51.732 | 0.000 | 1.000 |

| n | hitpoint (y, x) |
|---|---|
| 2 | ( 2.786, 0.000) |
| 3 | ( 4.885, 0.000) |
| 4 | (13.603, 0.000) |
| 5 | ( 2.408, 0.000) |

| local_fy(2-5) | local_fx(2-5) | 2Wy | 2Wx |
|---|---|---|---|
| 24.161 | 25.016 | 36.12 | 47.00 |

TABLE 10

(general - paraxial axis)

| | n | ry | rx | d | shift | tilt | nd | vd |
|---|---|---|---|---|---|---|---|---|
| | 1 | 0.00000 | 0.00000 | 23.129 | 0.000 | 0.000 | 1.000 | |
| FFS | 2 | −638.73602 | −638.73602 | 11.252 | −6.630 | −0.300 | 1.571 | 33.80 |
| FFS-M | 3 | −0.22716 | −0.22716 | −11.252 | −0.417 | −23.681 | −1.571 | 33.80 |
| FFS-M | 4 | −638.73602 | −638.73602 | 13.815 | −6.630 | −0.300 | 1.571 | 33.80 |
| TADOE | 5 | −76.05574 | −54.84811 | 1.378 | 18.621 | 52.410 | 1.000 | |
| | 6 | 0.00000 | 0.00000 | 0.613 | 19.703 | 40.036 | 1.492 | 57.40 |
| | 7 | 0.00000 | 0.00000 | 0.306 | 20.217 | 40.036 | 1.000 | |
| | 8 | 0.00000 | 0.00000 | 0.613 | 20.474 | 40.036 | 1.523 | 58.60 |
| | 9 | 0.00000 | 0.00000 | 0.000 | 20.989 | 40.036 | 1.000 | |
| | 10 | 0.00000 | 0.00000 | 0.000 | 20.989 | 40.036 | | |

| | | | | | | |
|---|---|---|---|---|---|---|
| FFS | 2 | $c1 = 3.3887e+02$ | $c5 = -1.7957e-03$ | $c6 = -8.6267e-04$ | $c10 = 9.1960e-06$ | $c11 = 7.0774e-07$ |
| | | $c12 = 1.3234e-06$ | $c13 = -4.8305e-08$ | $c14 = 8.1550e-08$ | $c20 = -6.0635e-09$ | $c21 = 5.5316e-09$ |
| | | $c22 = -2.5412e-08$ | $c23 = -1.4790e-10$ | $c24 = 5.6785e-11$ | $c25 = -6.4601e-11$ | $c26 = 2.1047e-11$ |
| FFS | 3 | $c1 = -1.2714e+13$ | $c5 = -1.2751e-03$ | $c6 = -3.9252e-03$ | $c10 = -4.9167e-06$ | $c11 = 8.2883e-07$ |
| | | $c12 = 3.0963e-08$ | $c13 = -1.4039e-07$ | $c14 = -4.4833e-08$ | $c20 = 3.6936e-10$ | $c21 = -1.7055e-09$ |
| | | $c22 = -2.9498e-09$ | $c23 = -2.4122e-11$ | $c24 = -3.8053e-11$ | $c25 = 1.1459e-10$ | $c26 = -6.6047e-11$ |
| FFS | 4 | $c1 = 3.3887e+02$ | $c5 = -1.7957e-03$ | $c6 = -8.6267e-04$ | $c10 = 9.1960e-06$ | $c11 = 7.0774e-07$ |
| | | $c12 = 1.3234e-06$ | $c13 = -4.8305e-08$ | $c14 = -8.1550e-08$ | $c20 = -6.0635e-09$ | $c21 = 5.5316e-09$ |
| | | $c22 = -2.5412e-08$ | $c23 = -1.4790e-10$ | $c24 = 5.6785e-11$ | $c25 = -6.4601e-11$ | $c26 = 2.1047e-11$ |
| TADOE | 5 | $c3 = 1.0903e-03$ | $c5 = -6.7348e-03$ | $c7 = 3.6001e-04$ | $c9 = 7.8007e-04$ | $c10 = -7.3272e-06$ |
| | | $c12 = 1.1246e-05$ | $c14 = -1.3543e-05$ | $c16 = -6.8610e-07$ | $c18 = -3.7814e-06$ | $c20 = -2.0250e-07$ |
| | | $c21 = -2.0250e-07$ | $c23 = -2.0250e-07$ | $c25 = -2.0250e-07$ | $c27 = -2.0250e-07$ | |

| n | point (y, x) | ry | rx |
|---|---|---|---|
| 2 | (0.000, 0.000) | −702.171 | −116.192 |
| 3 | (0.000, 0.000) | −75.503 | −54.516 |
| 4 | (0.000, 0.000) | −702.171 | −116.192 |
| 5 | (0.000, 0.000) | −76.056 | −54.848 |

(local - paraxial axis)

| | n | local-ry | local-rx | local-fy | local-fx | local-d | nd |
|---|---|---|---|---|---|---|---|
| FFS | 2 | −2201.19505 | −112.07300 | −3855.657 | −196.309 | 11.427 | 1.571 |

TABLE 10-continued

| | | | | | | | |
|---|---|---|---|---|---|---|---|
| FFS-M | 3 | −75.80085 | −54.75861 | 24.127 | 17.429 | −16.753 | −1.571 |
| FFS-M | 4 | −313.70593 | −83.19239 | −99.849 | −26.479 | 13.336 | 1.571 |
| TADOE | 5 | −76.05574 | −54.59826 | 133.221 | 95.635 | 0.000 | 1.000 |

| n | hitpoint (y, x) |
|---|---|
| 2 | ( 6.630, 0.000) |
| 3 | ( 0.460, 0.000) |
| 4 | (18.821, 0.000) |
| 5 | ( 6.160, 0.000) |

| local_fy(2-5) | local_fx(2-5) | 2Wy | 2Wx |
|---|---|---|---|
| 26.605 | 25.884 | 36.12 | 47.00 |

TABLE 11

(general - paraxial axis)

| | n | ry | rx | d | shift | tilt | nd | vd |
|---|---|---|---|---|---|---|---|---|
| | 1 | 0.00000 | 0.00000 | 10.000 | 0.000 | 0.000 | 0.000 | |
| FFS | 2 | 289.66977 | 289.66977 | 12.000 | −22.603 | 5.574 | 1.571 | 33.80 |
| FFS | 3 | 73.42792 | 73.42792 | 0.010 | −11.140 | 35.728 | 1.571 | 33.80 |
| FFS | 4 | 73.42792 | 73.42792 | 4.201 | −11.140 | 35.728 | 1.571 | 33.80 |
| FFS | 5 | 289.66977 | 289.66977 | 27.000 | −22.603 | 5.574 | 1.000 | |
| | 6 | 0.00000 | 0.00000 | 27.346 | 0.000 | 0.000 | 1.000 | |
| | 7 | 0.00000 | 0.00000 | 0.000 | 0.000 | 0.000 | 1.000 | |

| | | | | | | |
|---|---|---|---|---|---|---|
| FFS | 2 | $c1 = 2.7560e+01$ | $c5 = -4.8070e-04$ | $c6 = 5.0019e-04$ | $c10 = -3.1837e-06$ | $c11 = 7.8407e-05$ |
| | | $c12 = 1.0689e-06$ | $c13 = 6.2272e-09$ | $c14 = -1.8792e-08$ | $c20 = 4.7621e-09$ | $c21 = 1.1061e-08$ |
| | | $c22 = 9.5219e-09$ | | | | |
| FFS | 3 | $c1 = 1.8585e+00$ | $c5 = 1.6847e-03$ | $c6 = 5.9934e-04$ | $c10 = 8.5086e-06$ | $c11 = -3.1815e-06$ |
| | | $c12 = 2.5163e-07$ | $c13 = 3.6452e-07$ | $c14 = 1.2746e-07$ | $c20 = -8.2944e-10$ | $c21 = -9.6046e-10$ |
| | | $c22 = -1.7213e-09$ | | | | |
| FFS | 4 | $c1 = 1.8585e+00$ | $c5 = 1.6847e-03$ | $c6 = 5.9935e-04$ | $c10 = 8.5086e-06$ | $c11 = 3.1815e-06$ |
| | | $c12 = 2.5163e-07$ | $c13 = 3.6452e-07$ | $c14 = 1.2746e-07$ | $c20 = -8.2944e-10$ | $c21 = 9.6046e-10$ |
| | | $c22 = -1.7213e-09$ | | | | |
| FFS | 5 | $c1 = 2.7560e+01$ | $c5 = -4.8070e-04$ | $c6 = 5.0019e-04$ | $c10 = -3.1837e-06$ | $c11 = 7.8407e-05$ |
| | | $c12 = 1.0689e-06$ | $c13 = 6.2272e-09$ | $c14 = -1.8792e-08$ | $c20 = 4.7621e-09$ | $c21 = 1.1061e-08$ |
| | | $c22 = 9.5219e-09$ | | | | |

| n | point (y, x) | ry | rx |
|---|---|---|---|
| 1 | (0.000, 0.000) | 155.894 | 222.631 |
| 3 | (0.000, 0.000) | 79.067 | 51.595 |
| 4 | (0.000, 0.000) | 79.067 | 51.595 |
| 5 | (0.000, 0.000) | 155.894 | 222.631 |

(local - paraxial axis)

| | n | local-ry | local-rx | local-fy | local-fx | local-d | nd |
|---|---|---|---|---|---|---|---|
| FFS | 2 | 580.49917 | 92.93652 | 1016.814 | 162.789 | 6.710 | 1.571 |
| FFS | 3 | 66.59342 | 49.04312 | 0.000 | 0.000 | 0.010 | 1.571 |
| FFS | 4 | 66.59330 | 49.04307 | 0.000 | 0.000 | 9.485 | 1.571 |
| FFS | 5 | 570.00881 | 92.54652 | −998.439 | −162.106 | 0.000 | 1.000 |

| n | hitpoint (y, x) |
|---|---|
| 2 | (22.414, 0.000) |
| 3 | (12.776, 0.000) |
| 4 | (12.776, 0.000) |
| 5 | (22.615, 0.000) |

| local_fy(2-5) | local_fx(2-5) | 2Wy | 2Wx |
|---|---|---|---|
| −125975.319 | 2739.437 | 24.18 | 31.80 |

TABLE 12

(general - paraxial axis)

|  | n | ry | rx | d | shift | tilt | nd | vd |
|---|---|---|---|---|---|---|---|---|
|  | 1 | 0.00000 | 0.00000 | 10.000 | 0.000 | 0.000 | 1.000 |  |
| FFS | 2 | 203.61204 | 203.61204 | 8.000 | −14.836 | 10.209 | 1.571 | 33.80 |
| ADOE | 3 | 47.57081 | 47.57081 | 0.030 | −8.393 | 34.205 | 1.571 | 33.80 |
| ADOE | 4 | 47.57081 | 47.57081 | 6.503 | −8.393 | 34.205 | 1.571 | 33.80 |
| FFS | 5 | 203.61204 | 203.61204 | 27.000 | −14.836 | 10.209 | 1.000 |  |
|  | 6 | 0.00000 | 0.00000 | 25.279 | 0.000 | 0.000 | 1.000 |  |
|  | 7 | 0.00000 | 0.00000 | 0.000 | 0.000 | 0.000 | 1.000 |  |

| | | | | | | |
|---|---|---|---|---|---|---|
| FFS | 2 | $c1 = 1.1924e+01$ | $c5 = -5.4907e-04$ | $c6 = 1.1813e-03$ | $c10 = -7.2187e-07$ | $c11 = 7.6582e-05$ |
|  |  | $c12 = 1.1865e-06$ | $c13 = -3.1863e-07$ | $c14 = -2.1130e-07$ | $c20 = 4.5228e-09$ | $c21 = 2.5750e-09$ |
|  |  | $c22 = -7.6539e-09$ |  |  |  |  |
| FFS | 5 | $c1 = 1.1924e+01$ | $c5 = -5.4907e-04$ | $c6 = 1.1813e-03$ | $c10 = -7.2187e-07$ | $c11 = 7.6582e-05$ |
|  |  | $c12 = 1.1865e-06$ | $c13 = -3.1863e-07$ | $c14 = -2.1130e-07$ | $c20 = 4.5228e-09$ | $c21 = 2.5750e-09$ |
|  |  | $c22 = -7.6539e-09$ |  |  |  |  |

| n | point (y, x) | ry | rx |
|---|---|---|---|
| 2 | (0.000, 0.000) | 93.152 | 117.058 |
| 3 | (0.000, 0.000) | 47.571 | 47.571 |
| 4 | (0.000, 0.000) | 47.571 | 47.571 |
| 5 | (0.000, 0.000) | 93.152 | 117.058 |

(local - paraxial axis)

|  | n | local-ry | local-rx | local-fy | local-fx | local-d | nd |
|---|---|---|---|---|---|---|---|
| FFS | 2 | 114.48849 | 80.38485 | 200.540 | 140.804 | 5.166 | 1.571 |
| ADOE | 3 | 47.57081 | 46.65727 | 0.000 | 0.000 | 0.030 | 1.571 |
| ADOE | 4 | 47.57081 | 46.65722 | 0.000 | 0.000 | 9.327 | 1.571 |
| FFS | 5 | 113.43705 | 80.11362 | −198.699 | −140.329 | 0.000 | 1.000 |

| n | hitpoint (y, x) |
|---|---|
| 2 | (14.594, 0.000) |
| 3 | ( 9.278, 0.000) |
| 4 | ( 9.278, 0.000) |
| 5 | (14.854, 0.000) |

| local_fy(2-5) | local_fx(2-5) | 2Wy | 2Wx |
|---|---|---|---|
| 5382.437 | 2253.053 | 24.18 | 31.80 |

According to the present invention, the compact image display apparats can be accomplished in the structure permitting easy correction for chromatic aberration and permitting observation of the image information displayed on the display means with high image quality.

What is claimed is:

1. A prism body having a positive refractive power comprising three or more optical surfaces,
   wherein at least one of the optical surfaces is a decentered surface with curvature and comprises a diffracting surface having a rotationally asymmetric phase distribution, and
   wherein said diffracting surface has a symmetric phase distribution on a cross section normal to a cross section in which said optical surface is decentered.

2. A prism body having a positive refractive power comprising three or more optical surfaces,
   wherein at least one of the optical surfaces is a decentered surface with curvature and comprises a diffracting surface having a rotationally asymmetric phase distribution, and
   wherein at least one of said optical surfaces with curvature has both transmitting action and totally reflecting action.

3. A prism body having a positive refractive power comprising:
   a first transmitting surface to which light is incident,
   a first reflecting surface which totally reflects light from the first transmitting surface,
   a second reflecting surface which reflects reflected light from the first reflecting surface, and
   a second transmitting surface which has the same shape as the first reflecting surface and which transmits reflected light from the second reflecting surface,
   wherein at least one of the optical surfaces is a decentered surface with curvature and comprises a diffracting surface having a rotationally asymmetric phase distribution.

4. The prism body of claim 3, wherein the first transmitting surface or/and the second reflecting surface of said prism body are diffracting surfaces having a rotationally asymmetric phase distribution.

5. A prism body having a positive refractive power and having three or more optical surfaces, inclusive of a decentered optical surface with curvature, wherein said optical surfaces comprise a diffracting surface having a rotationally symmetric phase distribution on a surface with refractive powers differing depending upon azimuthal angles.

6. An image display apparatus comprising:
   a display means for displaying image information; and
   the prism body according to one of claim 1, 2–4, or 5 for guiding light from said display means to the pupil position of an observer to permit the observer to observe the image information displayed on the display means.

7. The image display apparatus of claim 6, wherein the light from the display means is guided to the observer without forming an intermediate image in said prism body.

8. An image display apparatus comprising:

a display means for displaying image information; and the prism body according to one of claim 1, 2–4, or 5 for guiding light from the display means to the pupil position of an observer, wherein one optical surface of the prism body is comprised of a half mirror surface, whereby the observer is permitted to observe both the image information displayed on the display means and image information of the outside through the half mirror surface, in a common field.

9. An image display apparatus comprising:

a display means for displaying image information; and an optical system for guiding light from the display means to the pupil position of an observer to permit the observer to observe the image information displayed on the display means, wherein said optical system comprises a plurality of decentered reflecting surfaces with curvature and at least one of the surfaces is a diffracting surface having a rotationally asymmetric phase distribution.

10. The image display apparatus of claim 9, wherein the light from the display means is guided to the observer without forming an intermediate image in said optical system.

11. The image display apparatus of claim 9, wherein one of the optical surfaces of the optical system is a half mirror surface, whereby the observer is permitted to observe both the image information displayed on the display means and image information of the outside through the half mirror surface, in a common field.

12. An optical system comprising a plurality of decentered, reflecting surfaces with curvature, said optical system comprising a diffracting surface having a rotationally symmetric phase distribution on a surface with refractive powers differing depending upon azimuthal angles.

* * * * *

UNITED STATES PATENT AND TRADEMARK OFFICE
CERTIFICATE OF CORRECTION

PATENT NO. : 6,687,057 B1
DATED : February 3, 2004
INVENTOR(S) : Yamazaki

It is certified that error appears in the above-identified patent and that said Letters Patent is hereby corrected as shown below:

Column 13,
Table 1, "C3=-4.9643e-06" should read -- C3 = -49643e-04 --; and
Table 1, "8.982" should read -- 8.987 --.

Column 17,
Table 3, "C21=2.5750e-09" should read -- C21= -2.5750e-09 --; and
Table 3, "C18=1.2599e-20" should read -- C18=1.2499e-20 --.

Column 19,
Table 5, "C15= -2.4157e-06" should read -- C16= -2.4157e-06 --; and
Table 5, "C25= -5.826e-11" should read -- C25= -5.8266e-11 --.

Column 21,
Table 6, "C1= -2.1246e-07" should read -- C13= -2.1246e-07 --.

Column 23,
Table 7, "C3=1.0825e-01" should read -- C3=1.0825e-03 --.

Column 27,
Table 18, "C14=8.1550e-08" should read -- C14= -8.1550e-08 --.

Column 29,
Table 11, "C6=5.9934e-04" should read -- C6=5.9935e-04 --;
Table 11, "C11=3.1815e-06" should read -- C11= -3.1815e-06 --.; and "C21=9.6046e-10" should read -- C21= -9.6046e-10 --.

Column 31,
Line 43, "apparats" should read -- apparatus --.

UNITED STATES PATENT AND TRADEMARK OFFICE
CERTIFICATE OF CORRECTION

PATENT NO. : 6,687,057 B1
DATED : February 3, 2004
INVENTOR(S) : Yamazaki

It is certified that error appears in the above-identified patent and that said Letters Patent is hereby corrected as shown below:

Column 32,
Line 66, "claim 1, 2-4a, 5" should read -- claims 1-5, --.

Column 33,
Line 9, "claim 1, 2-4a, 5" should read -- claims 1-5, --.

Signed and Sealed this

Twelfth Day of October, 2004

JON W. DUDAS
*Director of the United States Patent and Trademark Office*